(12) United States Patent
Hirata et al.

(10) Patent No.: US 11,378,035 B2
(45) Date of Patent: Jul. 5, 2022

(54) ENGINE CONTROL DEVICE

(71) Applicant: TOYOTA JIDOSHA KABUSHIKI KAISHA, Toyota (JP)

(72) Inventors: Yoshiharu Hirata, Susono (JP); Shintaro Hotta, Sunto-gun (JP); Takashi Amano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 17/060,210

(22) Filed: Oct. 1, 2020

(65) Prior Publication Data
US 2021/0131374 A1 May 6, 2021

(30) Foreign Application Priority Data

Nov. 6, 2019 (JP) .............................. JP2019-201641

(51) Int. Cl.
*F02D 41/38* (2006.01)
*B60K 6/26* (2007.10)
*F02D 9/08* (2006.01)
*B60K 6/24* (2007.10)
*B60K 6/46* (2007.10)
*F02D 41/14* (2006.01)
*F02D 41/28* (2006.01)

(52) U.S. Cl.
CPC ................ *F02D 41/38* (2013.01); *B60K 6/24* (2013.01); *B60K 6/26* (2013.01); *B60K 6/46* (2013.01); *F02D 9/08* (2013.01); *F02D 41/1454* (2013.01); *F02D 41/28* (2013.01); *B60Y 2200/92* (2013.01); *B60Y 2300/431* (2013.01); *B60Y 2300/432* (2013.01); *B60Y 2300/433* (2013.01); *B60Y 2400/43* (2013.01); *B60Y 2400/60* (2013.01); *F02D 2200/021* (2013.01); *F02D 2200/0404* (2013.01)

(58) Field of Classification Search
CPC ...... F02D 41/38; F02D 41/1454; F02D 41/28; F02D 9/08; F02D 2200/021; F02D 2200/0404; B60K 6/24; B60K 6/26; B60K 6/46; B60Y 2200/92; B60Y 2300/431; B60Y 2300/432; B60Y 2300/433; B60Y 2400/60
USPC .................................................... 180/65.245
See application file for complete search history.

(56) References Cited

FOREIGN PATENT DOCUMENTS

JP          S61255233 A  * 11/1986
JP          H0643820 B2  *  6/1994
(Continued)

*Primary Examiner* — Mahmoud Gimie
(74) *Attorney, Agent, or Firm* — Oliff PLC

(57) ABSTRACT

An engine control device includes a processor configured to execute a fuel injection control including: a first fuel injection processing for injecting an amount of fuel according to a first intake air amount based on an intake air flow rate detected by an air flow sensor; and a second fuel injection processing for injecting an amount of fuel according to a second intake air amount based on a throttle opening degree detected by a throttle position sensor. The processor selects the first fuel injection processing when a pulsation rate of the intake air flow rate is equal to or lower than a pulsation rate threshold value, and selects the second fuel injection processing when the pulsation rate is higher than the pulsation rate threshold value. The pulsation rate threshold value is smaller when a temperature correlation value is low than when the temperature correlation value is high.

5 Claims, 13 Drawing Sheets

(56) References Cited

FOREIGN PATENT DOCUMENTS

| | | | |
|---|---|---|---|
| JP | H06-307273 | A | 11/1994 |
| JP | 2008-202534 | A | 9/2008 |
| JP | 2017-186965 | A | 10/2017 |

* cited by examiner

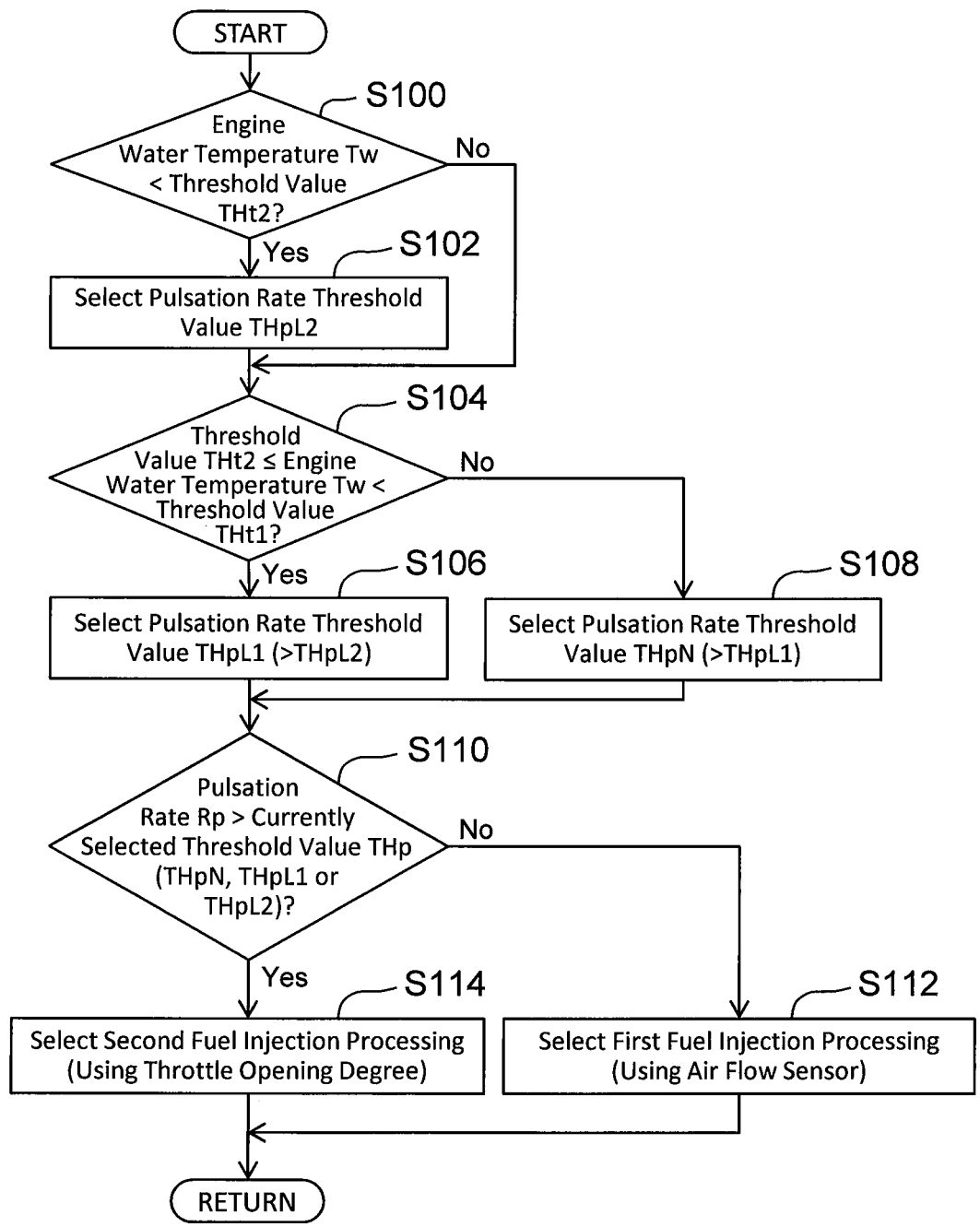

ENGINE CONTROL DEVICE

CROSS-REFERENCE TO RELATED APPLICATION

The present disclosure claims priority under 35 U.S.C. § 119 to Japanese Patent Application No. 2019-201641, filed on Nov. 6, 2019. The content of which is incorporated herein by reference in its entirety.

BACKGROUND

Technical Field

The present disclosure relates to an engine control device, and more particularly to an engine control device for controlling a spark ignition internal combustion engine.

Background Art

JP H06-307273 A discloses a fuel injection control device for an internal combustion engine. This internal combustion engine is provided with a communication passage and a secondary air supply device. The communication passage is configured to connect an intake air passage and an exhaust gas passage while bypassing a cylinder. The secondary air supply device is configured to supply part of intake air as a secondary air for exhaust gas purification, to the exhaust gas passage through the communication passage. In addition, when the pulsation of the intake air propagating to an air flow sensor through the intake air passage resonates with the pulsation of the secondary air propagating to the air flow sensor through the communication passage in association with the supply of the secondary air, and the secondary air is detected, an intake air amount used for calculating a fuel injection amount is switched as follows. That is to say, switching from an intake air amount based on the output of the air flow sensor to an intake air amount based on a throttle opening degree and an engine speed is performed.

Moreover, JP 2017-186965 A discloses the following technique. That is, in order to reduce the number of particulate matters in exhaust gas (i.e., PN: Particulate Number), an injection timing in an intake stroke injection by an in-cylinder fuel injection valve is retarded by a greater amount when piston temperature is equal to or lower than a predetermined temperature than when the piston temperature is higher than the predetermined temperature. An ignition timing is also retarded by a greater amount when the piston temperature is equal to or lower than the predetermined temperature and an intake air amount is equal to or less than a predetermined amount, as compared to an MBT (Minimum Advance for Best Torque) ignition timing.

Furthermore, JP 2008-202534 A discloses a technique for controlling a driving timing of an in-cylinder fuel injection valve on the basis of an intake air pulsation.

SUMMARY

As a method of calculating a fuel injection amount, a method using an intake air amount (first intake air amount) based on the output of an air flow sensor disposed upstream of a throttle valve (first calculation method) and a method using an intake air amount (second intake air amount) based on a throttle opening degree (second calculation method) are known. According to the first calculation method that uses the first intake air amount detected more directly, in transient operating conditions in which engine torque (i.e., actual intake air amount) changes over time, the intake air amount is easily acquired with high accuracy as compared to the second calculation method. However, in high engine load conditions in which the throttle opening degree is large, intake air pulsation easily reaches the position of the air flow sensor. Therefore, in the high engine load conditions, the output of the air flow sensor (i.e., intake air flow rate) and the first intake air amount based on the output are easily pulsated due to the influence of the intake air pulsation, and as a result, the controllability of air-fuel ratio may decrease. On the other hand, the second calculation method has an advantage that the second intake air amount can be calculated (estimated) without being affected by the intake air pulsation.

Accordingly, for a fuel injection control, the first calculate method may be used when a pulsation rate, which is the fluctuation rate of the pulsation of the intake air flow rate detected by the air flow sensor, is equal to or lower than a pulsation rate threshold value. Also, the second calculation method may be used when the pulsation rate is higher than the pulsation rate threshold value. On the other hand, the particulate number PN increases when the temperature of the internal combustion engine (typically, engine water temperature) is low and the engine load is high. Therefore, if the first calculation method is used even under high load conditions at low temperatures where the particulate number PN increases (i.e., if the first intake air amount is used for a long time), the particulate number PN may increase when the air-fuel ratio fluctuates to the rich side. Because of this, it is required that the pulsation rate threshold value is appropriately set with also taking into consideration this kind of characteristics of the particulate number PN.

The present disclosure has been made in view of the problem described above, and an object of the present disclosure is to provide an engine control device that can achieve a fuel injection control capable of appropriately selecting either the first intake air amount or the second intake air amount based on the pulsation rate while reducing an increase in the particulate number PN.

An engine control device according to the present disclosure for controlling an internal combustion engine including a fuel injection device configured to supply fuel to a cylinder and a throttle valve disposed in an intake air passage includes: a processor; an air flow sensor disposed in the intake air passage upstream of the throttle valve and configured to detect an intake air flow rate; and a throttle position sensor configured to detect a throttle opening degree of the throttle valve. The processor is configured to execute a fuel injection control including: a first fuel injection processing to control the fuel injection device so as to inject an amount of fuel according to a first intake air amount based on the intake air flow rate detected by the air flow sensor; and a second fuel injection processing to control the fuel injection device so as to inject an amount of fuel according to a second intake air amount based on the throttle opening degree detected by the throttle position sensor. The processor is configured to: select the first fuel injection processing when a pulsation rate being a fluctuation rate of pulsation of the intake air flow rate detected by the air flow sensor is equal to or lower than a pulsation rate threshold value; and select the second fuel injection processing when the pulsation rate is higher than the pulsation rate threshold value. The pulsation rate threshold value is smaller when a temperature correlation value correlated with temperature of the internal combustion engine is low than when the temperature correlation value is high.

The pulsation rate threshold value may be corrected so as to be greater when a torque increase rate being a time rate of increase in torque of the internal combustion engine is high than when the torque increase rate is low.

The pulsation rate threshold value may be corrected so as to be smaller when torque of the internal combustion engine is high than when the torque is low.

The engine control device may be mounted on a hybrid vehicle including the internal combustion engine, an electric motor and a generator and having a series hybrid mode in which all of motive power of the internal combustion engine is used to drive the generator to generate electric power and a wheel of the vehicle is driven by the electric motor. The pulsation rate threshold value may include a first pulsation rate threshold value selected when the temperature correlation value is equal to or greater than a temperature threshold value, and a second pulsation rate threshold value selected when the temperature correlation value is smaller than the temperature threshold value. The second pulsation rate threshold value is smaller than the first pulsation rate threshold value. The processor may be configured to execute the following torque increase rate limiting processing during selection of the second pulsation rate threshold value. This torque increase rate limiting processing limits a torque increase rate, which is a time rate of increase of torque of the internal combustion engine, to be lower during at least a part of a torque increase time period from when the pulsation rate reaches the second pulsation rate threshold value and a switching to the second fuel injection processing is performed until the torque of the internal combustion engine reaches a target torque, than during selection of the first pulsation rate threshold value.

The engine control device may include an air-fuel ratio sensor configured to output a signal responsive to oxygen concentration of exhaust gas. The processor may be configured to execute an air-fuel ratio feedback control to adjust a fuel injection amount such that an actual air-fuel ratio based on the output of the air-fuel ratio sensor approaches a target air-fuel ratio. In the torque increase rate limiting processing, the processor may be configured to limit the torque increase rate to a low value by adjusting the throttle opening degree such that a width of fluctuation of the actual air-fuel ratio associated with the air-fuel ratio feedback control during the at least a part of the torque increase time period falls within a fluctuation with threshold value.

According to the engine control device of the present disclosure, when the temperature correlation value correlated with the temperature of the internal combustion engine is low, a pulsation rate threshold value, which is smaller than that when the temperature correlation value is high, is used. By lowering the pulsation rate threshold value in the low temperatures in this manner, the switching to the second fuel injection processing that does not use the first intake air amount can be performed before the pulsation of the first intake air amount becomes too large. This makes it possible to achieve the fuel injection control capable of appropriately selecting either the first intake air amount or the second intake air amount based on the pulsation rate while reducing an increase in the particulate number PN.

BRIEF DESCRIPTION OF THE DRAWINGS

FIG. 8 is a flowchart showing a routine of processing relating to a fuel injection control according to the first embodiment;

DETAILED DESCRIPTION

In the following embodiments of the present disclosure, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

A first embodiment according to the present disclosure and modification examples thereof will be described with reference to FIGS. 1 to 11.

1-1. Configuration Example of Powertrain System

Figure 1:
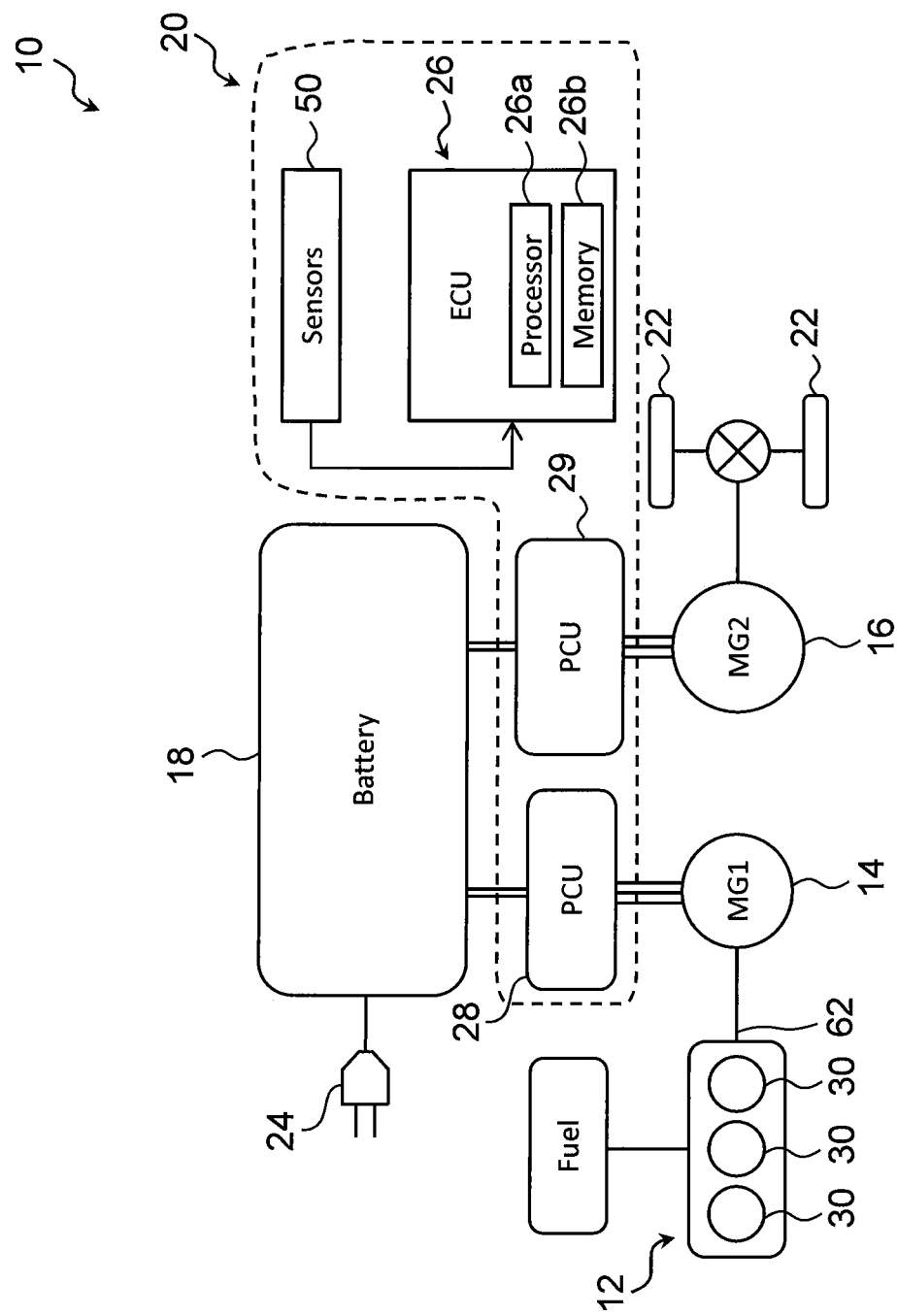
FIG. 1 is a schematic diagram showing an example of a configuration of a powertrain system of a vehicle to which an engine control device according to a first embodiment of the present disclosure is applied.

FIG. 1 is a schematic diagram showing an example of the configuration of a powertrain system 10 of a vehicle to which an engine control device according to the first embodiment is applied. The powertrain system 10 shown in FIG. 1 includes an internal combustion engine 12, two motor generators 14 and 16 (hereinafter, referred to as "MG1" and "MG2"), a battery (DC power supply) 18 configured to store electric power supplied to the MG2, and a control device 20. The internal combustion engine 12 is an engine dedicated to power generation, which is coupled to the MG1. The MG1 is driven by the motive power of the internal combustion engine 12 to generate an electric power. The generated electric power is supplied to the battery 18. The MG2 uses the electric power supplied from the battery 18 to drive the vehicle (wheels 22). The powertrain system 10 is also configured to charge the battery 18 with electric power supplied from the outside of the vehicle via a plug 24.

The vehicle on which the powertrain system 10 having the above described configuration is mounted corresponds to a so-called REEV (Range Extended Electric Vehicle). To be more specific, the REEV is used as a BEV (Battery-Electric Vehicle) driven by the MG2 using only the electric power stored in the battery 18 at the startup of the vehicle, until the remaining amount of the battery 18 (i.e., the State of Charge (SOC) which indicates the rate of charge of the battery 18) falls below a predetermined lower limit value. Furthermore, when the SOC falls below the lower limit value, the battery 18 is charged with the electric power generated using the motive power of the internal combustion engine 12 to extend the cruising range. Therefore, an internal combustion engine having a small engine displacement with respect to the vehicle (mainly, with respect to the size and weight of the vehicle) is basically used as the internal combustion engine mounted on the REEV as in the internal combustion engine 12. The REEV may also be classified as a type of a Plug-in Hybrid Electric Vehicle (PHEV).

Figure 2:
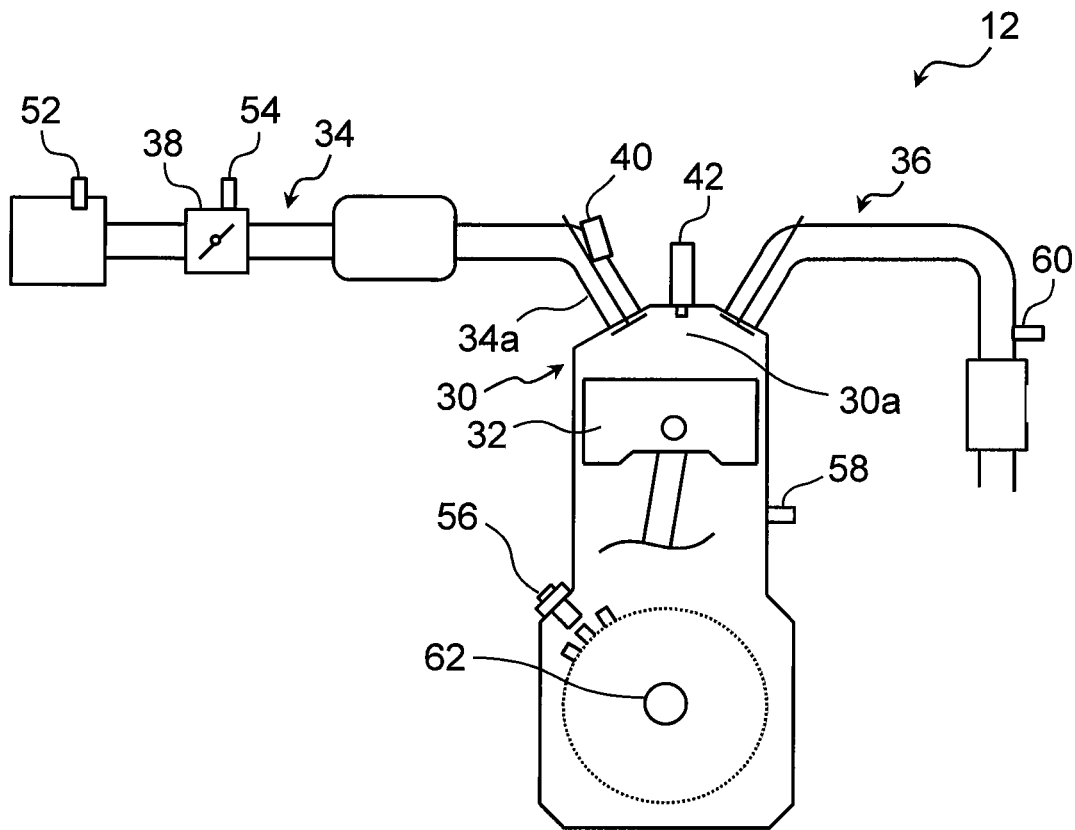
FIG. 2 is a schematic diagram showing an example of a configuration of an internal combustion engine shown in FIG. 1.

The internal combustion engine 12 operates with the supply of fuel. More specifically, the internal combustion engine 12 is a spark ignition engine, and as an example, an in-line three-cylinder engine. FIG. 2 is a schematic diagram showing an example of the configuration of the internal combustion engine 12 shown in FIG. 1. The internal combustion engine 12 is a naturally aspirated engine as an example, but may be configured as a supercharged engine. In each cylinder 30, a piston 32 which reciprocates inside the corresponding cylinder 30 is disposed. A combustion chamber 30a of each cylinder 30 is communicated with an intake air passage 34 and an exhaust gas passage 36. An electronically controlled throttle valve 38 is disposed in the intake air passage 34 for an intake air amount control. The internal combustion engine 12 also includes a fuel injection device 40 (only a fuel injection valve is shown) and an ignition device 42 (only an ignition plug is shown). In the example shown in FIG. 2, the fuel injection device 40 includes a port fuel injection valve for injecting fuel into an intake port 34a, but may include an in-cylinder fuel injection valve instead of or in addition to the port fuel injection valve.

A control device 20 is configured to control the internal combustion engine 12 (including the throttle valve 38, the fuel injection device 40 and the ignition device 42), the MG1 and the MG2. The MG1 and MG2 are three-phase AC type as an example. The control device 20 includes an electronic control unit (ECU) 26 and power control units (PCUs) 28 and 29. The PCU 28 and 29 each include a power converter (i.e., an inverter) equipped with a plurality of switching elements. The PCU 28 controls the MG1 based on a command from the ECU 26, and the PCU 29 controls the MG2 based on a command from the ECU 26. The MG1 also functions as a starter motor for cranking the internal combustion engine 12.

The ECU 26 includes at least one processor 26a and at least one memory 26b. The memory 26b stores various data including maps used for controlling the internal combustion engine 12, the MG1 and the MG2, and also stores various control programs. The processor 26a receives and executes a control program from the memory 26b, and thereby, various kinds of processing and control by the control device 20 is achieved.

The control device 20 further includes sensors 50 for controlling the operation of the powertrain system 10. The sensors 50 include an air flow sensor 52, a throttle position sensor 54, a crank angle sensor 56, a water temperature sensor 58 and an air-fuel ratio sensor 60 shown in FIG. 2 as sensors relating to an engine control. The air flow sensor 52 is disposed at an inlet (i.e., on the upstream side of the throttle valve 38) of the intake air passage 34 to detect an intake air flow rate. The airflow sensor 52 is, for example, a hot wire type. However, as long as the output (intake air flow rate) pulsates due to the influence of the intake air pulsation, an air flow sensor of another type other than the hot wire type may be used. The throttle position sensor 54 detects an opening degree of the throttle valve 38 (throttle opening degree TA). The crank angle sensor 56 is disposed in the vicinity of a crankshaft 62 and outputs a signal responsive to the crank angle. The ECU 26 calculates an engine speed NE on the basis of the signal of the crank angle sensor 56. The water temperature sensor 58 outputs a signal responsive to engine cooling water temperature (engine water temperature) Tw. The air-fuel ratio sensor 60 outputs a signal responsive to the oxygen concentration of exhaust gas flowing through the exhaust gas passage 36. The ECU 26 acquires (calculates) the air-fuel ratio on the basis of the output of the air-fuel ratio sensor 60.

It should be noted that, in the example of the powertrain system 10, the control device 20 corresponds to an example of the "engine control device" according to the present disclosure, and is configured to control not only the internal combustion engine 12 but also the MG1 and the MG2. However, instead of this kind of example, the engine control device may be configured to control only the internal combustion engine 12. More specifically, the control device provided in the powertrain system 10 may include, for example, an engine control device including an engine ECU that controls the internal combustion engine 12, separately from a hybrid ECU, a generator ECU and a motor ECU. The hybrid ECU controls the powertrain system 10 in a comprehensive manner. The generator ECU controls the MG1. The motor ECU controls the MG2.

1-2. Fuel Injection Control

The control of the powertrain system 10 performed by the ECU 26 includes a fuel injection control of the internal combustion engine 12. This fuel injection control includes a "first fuel injection processing" and a "second fuel injection processing". The ECU 26 (processor 26a) selectively performs the first fuel injection processing and the second fuel injection processing as described below.

1-2-1. First Fuel Injection Processing and Second Fuel Injection Processing

The first fuel injection processing uses an intake air amount (hereinafter referred to as a "first intake air amount") [g] calculated based on the intake air flow rate [g/s] detected by the air flow sensor 52, and controls the fuel injection device 40 such that an amount of fuel according to this first intake air amount is injected. In more detail, the first intake air amount can be calculated on the basis of the above described intake air flow rate and the engine speed NE. According to the first fuel injection processing, the fuel injection amount (basic injection amount) is calculated such that a target air-fuel ratio (for example, stoichiometric air-fuel ratio) can be acquired under the first intake air amount.

On the other hand, the second fuel injection processing uses an intake air amount (hereinafter, referred to as a "second intake air amount") based on the throttle opening degree TA detected by the throttle position sensor 54, and controls the fuel injection device 40 such that an amount of fuel according to this second intake air amount is injected. The second intake air amount may be calculated on the basis of only the throttle opening degree TA, but is herein calculated (estimated) on the basis of the throttle opening degree TA and the engine speed NE as an example. More specifically, the second intake air amount is calculated from, for example, a map (not shown) that defines the relationship of the second intake air amount with respect to the throttle opening degree TA and the engine speed NE.

(Correction Processing of Second Intake Air Amount)

The second intake air amount calculated as described above is an estimated value (a predicted value) of the intake air amount based on the throttle opening degree TA and the engine speed NE. According to the present embodiment, in order to obtain the second intake air amount with higher accuracy, the ECU 26 performs a correction processing of the second intake air amount. Specifically, in this correction processing, the second intake air amount calculated, from the map, as a value according to the throttle opening degree TA and the engine speed NE as described above is used as a base value thereof. Then, this base value is corrected using a correction coefficient $K_{af}$ depending on the difference or the ratio of the "actual air-fuel ratio" to the target air-fuel ratio (as an example, the stoichiometric air-fuel ratio). The actual air-fuel ratio mentioned here is a calculated value of the air-fuel ratio based on the output of the air-fuel ratio sensor 60.

The following Equation (1) corresponds to an example of an equation for calculating the second intake air amount with correction by the correction processing. In equation (1), a value acquired by dividing the actual air-fuel ratio by the target air-fuel ratio (i.e., the actual air-fuel ratio/the target air-fuel ratio) is given as the correction coefficient $K_{af}$. According to this kind of correction processing, when the actual air-fuel ratio is smaller than the target air-fuel ratio (that is, when the actual air-fuel ratio is shifted to the rich side), the correction coefficient $K_{af}$ becomes greater than 1. Therefore, the second intake air amount is corrected so as to be greater than the base value. Conversely, when the actual air-fuel ratio is greater than the target air-fuel ratio (that is, when the air-fuel ratio is shifted to the lean side), the correction coefficient $K_{af}$ is smaller than 1. Therefore, the second intake air amount is corrected so as to be less than the base value.

$$\text{Second Intake Air Amount} = \text{Base Value} \times K_{af} \quad (1)$$

(Air-Fuel Ratio Feedback Control)

The ECU 26 performs an air-fuel ratio feedback control on condition that a designated execution condition is satisfied during execution of the first or second fuel injection processing. This air-fuel ratio feedback control is generally performed in an internal combustion engine, and the detailed description thereof is omitted. The outline of the air-fuel ratio feedback control is to adjust the fuel injection amount such that the actual air-fuel ratio acquired using the air-fuel ratio sensor 60 approaches the target air-fuel ratio (e.g., the stoichiometric air-fuel ratio). Accordingly, the fuel injection amount (basic injection amount) calculated by the first or second fuel injection processing is corrected by this air-fuel ratio feedback control, and the corrected amount of fuel is injected by the fuel injection device 40.

1-2-2. Switching of Fuel Injection Processing Based on Pulsation Rate Rp

According to the method of calculating the fuel injection amount (i.e., the first calculation method) using the first intake air amount based on the output of the air flow sensor 52, the intake air amount can be detected more directly. Because of this, in transient operating conditions in which the engine torque (i.e., the actual intake air amount) changes over with time, the intake air amount can be acquired with high accuracy as compared to the method (second calculation method) using the second intake air amount based on the throttle opening degree TA. However, in high engine load conditions, the first intake air amount easily pulsates due to the influence of the intake air pulsation. The reason is that, in high engine load conditions, the throttle opening degree TA is large and as a result, the intake air pulsation is easily reached to the air flow sensor 52 disposed on the upstream side of the throttle valve 38. On the other hand, the second calculation method has an advantage that the intake air amount can be calculated (estimated) without being affected by the intake air pulsation.

In view of the above, the ECU 26 selects the first fuel injection processing when a pulsation rate Rp, which is the fluctuation rate of the pulsation of the intake air flow rate detected by the air flow sensor 52 is equal to or lower than a predetermined pulsation rate threshold value (simply referred to as a "threshold value THp"), and selects the second fuel injection processing when the pulsation rate Rp is higher than the threshold value THp. The pulsation rate Rp [%] can be calculated using, for example, the following Equation (2). The ECU 26 calculates the pulsation rate Rp for each cycle of the internal combustion engine 12.

$$Rp = (Q\text{max} - Q\text{min})/Q\text{ave} \times 100 \quad (2)$$

In Equation (2), Qmax and Qmin are, respectively, the maximum value and the minimum value of the amplitude of the output signal of the air flow sensor 52 (i.e., air flow rate signal) during the most recent predetermined crank angle period (e.g., a predetermined plurality of cycles). Qave is an average value of the airflow rate signals during the predetermined crank angle period described above.

1-2-3. Issue on Switching of Fuel Injection Processing

Figure 3:
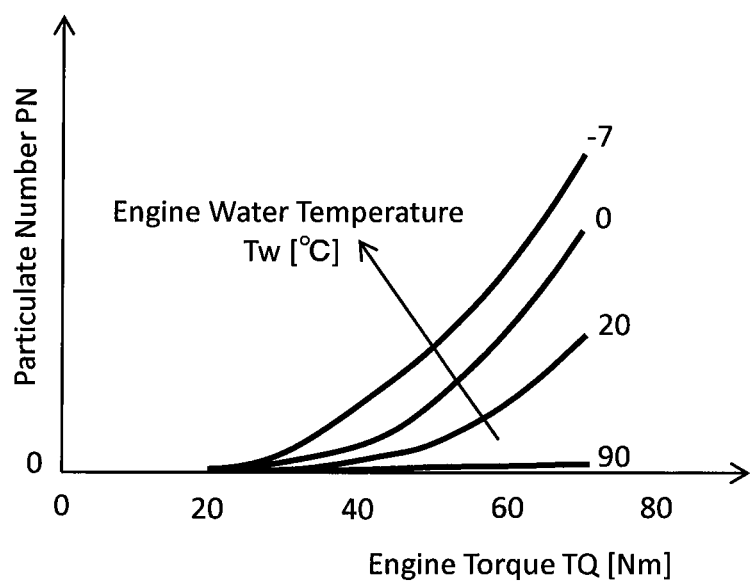
FIG. 3 is a graph showing a relationship of particulate number PN with respect to engine water temperature Tw and engine torque TQ.

FIG. 3 is a graph showing a relationship of the particulate number PN with respect to the engine water temperature Tw and the engine torque TQ. As shown in FIG. 3, the particulate number PN increases when the temperature of the internal combustion engine 12 (typically, the engine water temperature Tw) is low and the engine torque TQ [Nm] (i.e., the engine load) is high. In more detail, the particulate number PN becomes greater when the engine water temperature Tw is lower, and also becomes greater when the engine load is higher. In particular, in a water temperature range that is lower than the normal temperature (for example, 20° C.), the degree of increase in the particulate number PN with respect to the decrease in the engine water temperature Tw becomes remarkably high.

Figure 4:
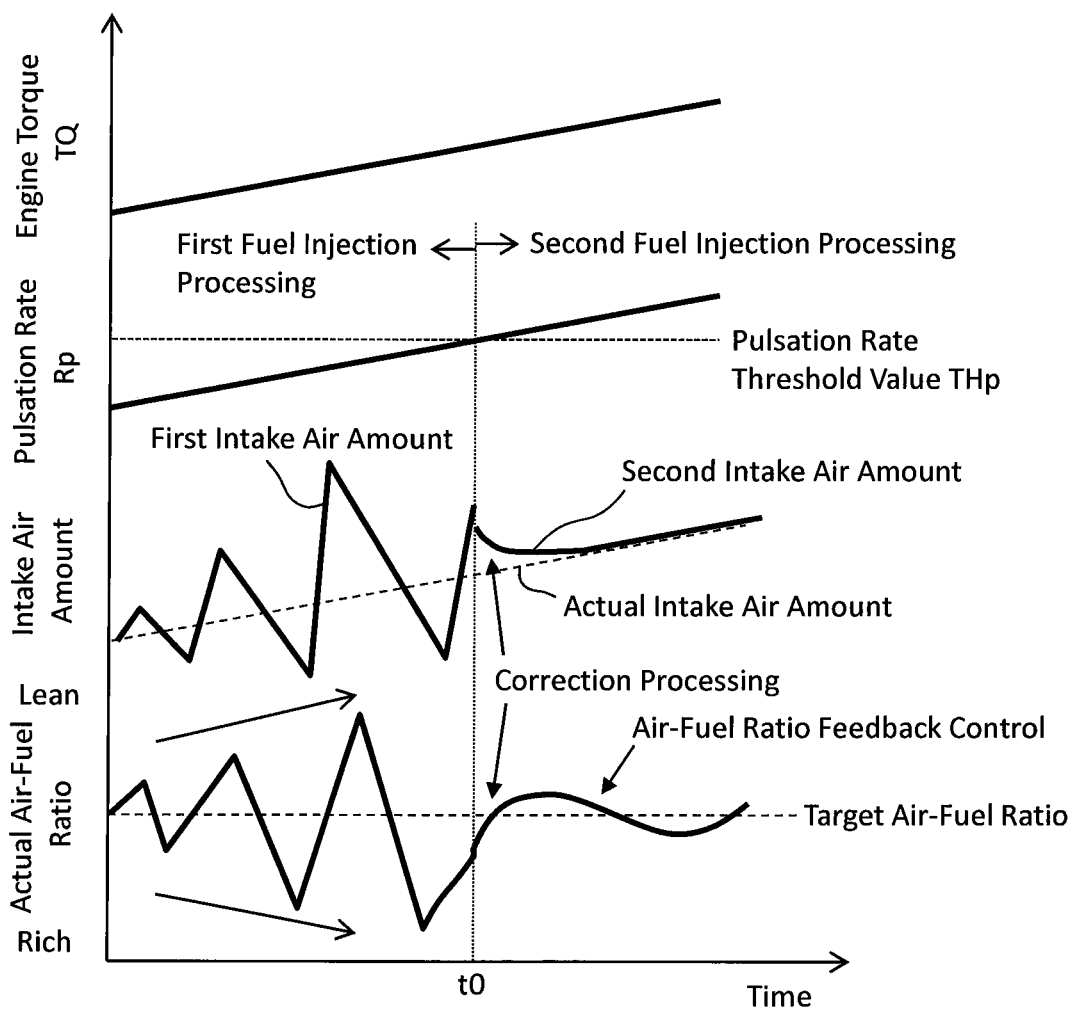
FIG. 4 is a time chart of a reference example for explaining an issue on the switching of fuel injection processing.
Figure 6:
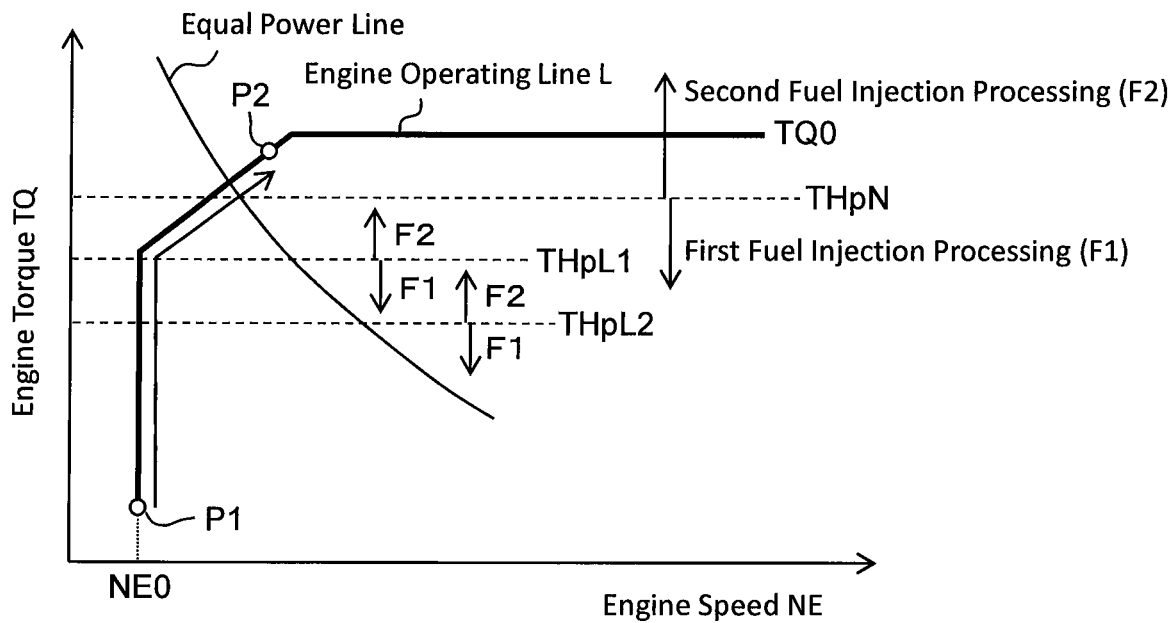
FIG. 6 is a graph schematically showing an example of an engine operating line L used in the internal combustion engine shown in FIG. 1.

FIG. 4 is a time chart of a reference example for explaining an issue on the switching of the fuel injection processing. FIG. 4 shows an operation in a transient operating condition in which it is desired to increase the engine torque TQ rapidly up to a high load range. In the REEV, this kind of transient operating condition corresponds to, for example, the start-up of the internal combustion engine 12 as illustrated in FIG. 6 described below. It should be noted that, in the reference example shown in FIG. 4, a fixed value is used as the threshold value THp of the pulsation rate Rp.

When the intake air flow rate detected by the air flow sensor 52 pulsates, the first intake air amount also pulsates. More specifically, as the engine torque TQ (i.e., the engine load) increases, the amplitude of the pulsation of the intake air flow rate increases. As a result, the amplitude of the pulsation of the first intake air amount increases as shown in FIG. 4, and the pulsation rate Rp thus increases. A time point t0 corresponds to the time point at which the switching from the first fuel injection processing to the second fuel injection processing is performed in response to the pulsation rate Rp reaching the threshold value THp.

It should be noted that the first and second intake air amounts are calculated values used for calculating the fuel injection amount. On the other hand, the intake air amount shown by a broken line in FIG. 4 corresponds to the actual intake air amount. In addition, FIG. 4 shows that, after the switching to the second fuel injection processing, the above described correction processing of the second intake air amount causes the second intake air amount to converge to the actual intake air amount (broken line), and also causes the actual air-fuel ratio based on the output of the air-fuel ratio sensor 60 to approach the stoichiometric air-fuel ratio. Furthermore, FIG. 4 shows that, after the switching to the second fuel injection processing, the air-fuel ratio feedback control causes the actual air-fuel ratio to fluctuate around the stoichiometric air-fuel ratio.

As described above, the first calculation method is more suitable for the transient operating condition than the second calculation method. Therefore, when taking into consideration the transient operating condition in which it is desired to increase the engine torque TQ rapidly to a high load range as in the example shown in FIG. 4, in order to use the first calculation method as long as possible while the engine torque TQ is increasing, it is desired to increase the threshold value THp as large as possible. However, as the engine load increases, the pulsation of the first intake air amount increases. As a result, as in a time period before the time point t0 in FIG. 4, the controllability of the actual air-fuel ratio gradually decreases (i.e., the fluctuation width of the actual air-fuel ratio gradually increases) in association with an increase in the pulsation of the first intake air amount. If the actual air-fuel ratio is shifted to the rich side when the controllability of the actual air-fuel ratio is lowered in this manner (i.e., after the fluctuation width of the actual air-fuel ratio increases), there is a concern that the particulate number PN may increase. Then, as described with reference to FIG. 3, the particulate number PN becomes significantly large under low water temperature. Because of this, the influence of the above described rich change in the actual air-fuel ratio on the increase in the particulate number PN becomes large under low water temperature.

Additionally, the internal combustion engine 12 for the REEV has a small engine displacement with respect to (the size of) the vehicle as described above, high loads are likely to be used frequently. Thus, the internal combustion engine to which the fuel injection control according to the first embodiment is applied may not always be used for the REEV, but the issue described above becomes remarkable in the REEV. Furthermore, the internal combustion engine 12 is an in-line three-cylinder engine. In internal combustion engines with four or more cylinders in line, the opening angle of the intake valve partially overlaps between the cylinders, which acts to reduce the intake air pulsation. In contrast, in the in-line three-cylinder type with a wide explosion interval, the effect of reducing the intake air pulsation cannot be obtained because the opening angle of the intake valve does not overlap between the cylinders. For this reason, in the in-line three-cylinder engine, the output of the air flow sensor is more likely to be affected by the intake air pulsation, as compared to an engine having four or more in-line cylinders. The issue described above becomes remarkable in the internal combustion engine 12 also from this kind of viewpoint.

1-2-4. Setting of Pulsation Rate Threshold Value in Consideration of Reduction of Increase in PN In view of the issue described above, according to the present embodiment, the threshold value THp of the pulsation rate Rp is reduced when the engine water temperature Tw is low than when the engine water temperature Tw is high. It should be noted that, according to the present embodiment, the engine water temperature Tw corresponds to an example of "the temperature correlation value correlated with the temperature of the internal combustion engine" according to the present disclosure.

Figure 5:
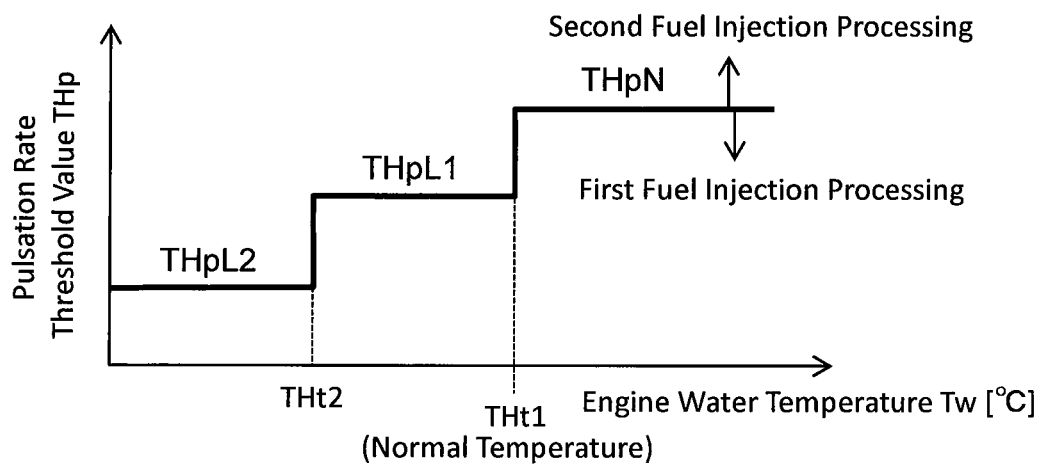
FIG. 5 is a graph showing a relationship between three threshold values THpN, THpL1 and THpL2 used in the first embodiment and the engine water temperature Tw.

FIG. 5 is a graph showing a relationship between three threshold values THpN, THpL1 and THpL2 used in the first embodiment and the engine water temperature Tw. According to the present embodiment, three thresholds THpN, THpL1, THpL2 are used as the thresholds THp. The threshold value THpN is used when the engine water temperature Tw is equal to or higher than a temperature threshold value THt1. This temperature threshold value THt1 is, for example, a normal temperature (about 20-25° C.). That is to say, the threshold value THpN is used when the engine water temperature Tw is in a water temperature range of the normal temperature or higher (i.e., at the normal state). In this kind of normal state, as shown in FIG. 3, the particulate number PN becomes relatively small.

On the other hand, the remaining threshold values THpL1 and THpL2 are set to be smaller than the threshold value THpN, and are used at low water temperatures lower than the temperature threshold value THt1 (i.e., the normal temperature). Moreover, the threshold value THpL2 is set to be even smaller than the threshold value THpL1, and is used at extremely low temperatures at which the engine water temperature Tw is lower than the temperature threshold value THt2 (<temperature threshold value THt1).

FIG. 6 is a graph schematically showing an example of an engine operating line L used in the internal combustion engine 12 shown in FIG. 1. The vertical axis of FIG. 6 is the engine torque TQ, and the horizontal axis is the engine speed NE. The internal combustion engine 12, which is a dedicated engine for power generation mounted on the REEV, is intermittently started each time a power generation request is made. In addition, the target engine output is made higher when the required amount of power generation is greater.

In increasing the engine output, the engine operating point moves along the engine operating line L represented in FIG.

6. More specifically, the engine operating point advances in a direction in which the engine torque TQ increases at a minimum engine speed NE0. Then, the engine operating point advances to a high-speed and high-load side and reaches a maximum torque TQ0. Thereafter, the engine speed NE increases at the maximum torque TQ0. The reason why this kind of engine operating line L is adopted is as follows. That is to say, in order to reduce vibration and noise during engine operation for power generation purposes, the internal combustion engine 12 is required to operate with the engine speed NE reduced as much as possible. Therefore, when realizing a designated engine output, it is required to increase the engine torque TQ as much as possible on an engine equal power line L as exemplified in FIG. 6. It can be said that the internal combustion engine 12 mounted on the REEV is likely to be heavily used in a high load range not only for the reason that the engine displacement is small with respect to the vehicle as described above but also for the reason described here.

The pulsation rate Rp becomes higher when the engine torque TQ (i.e., the engine load) is higher. For this reason, the above-described three threshold values THpN, THpL1 and THpL2 can be represented using a straight line with a constant engine torque TQ as shown schematically in FIG. 6. FIG. 6 shows an example in which the internal combustion engine 12 is started upon receiving a power generation request and the engine operating point shifts from P1 to P2.

According to the switching method of the fuel injection processing according to the present embodiment, in the above-described example of the transition of the engine operating point, if the engine water temperature Tw is equal to or higher than the threshold value THt1 equivalent to the normal temperature, the switching from the first fuel injection processing (F1) to the second fuel injection processing (F2) is executed when the pulsation rate Rp reaches the threshold value THpN on the highest load side. Also, if the engine water temperature Tw is lower than the threshold value THt1 and is higher than or equal to the threshold value THt2, the switching of the fuel injection processing is performed at the threshold value THpL1 for low temperature that is less than the threshold value THpN. As a result, the switching is performed at a lower engine load than that when the engine water temperature Tw is equivalent to or higher than the normal temperature. If the engine water temperature Tw is lower than the threshold value THt2, the switching of the fuel injection processing is performed at the threshold value THpL2 for extremely low temperature.

As exemplified in FIG. 6, the switching of the fuel injection processing according to the present embodiment is performed with a lower pulsation rate Rp when the engine water temperature Tw is lower.

(Correction of Pulsation Rate Threshold Value Based on ΔTQ and TQ)

Figure 7A:
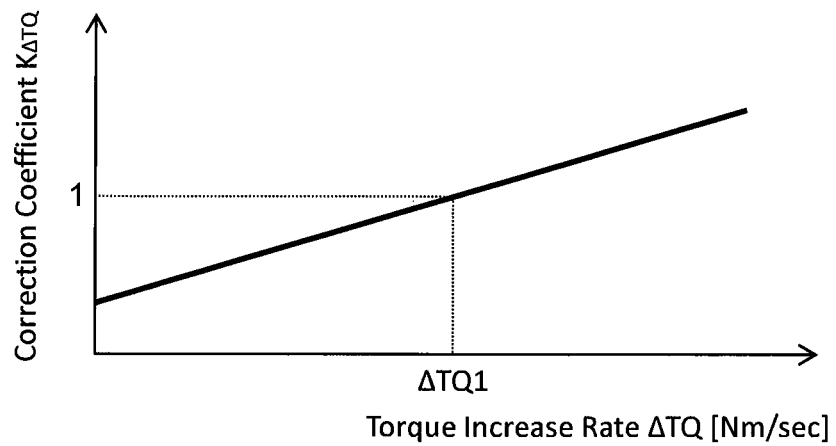
FIG. 7A is a graph showing an example of a relationship between torque increase rate $\Delta TQ$ and correction coefficient $K_{\Delta TQ}$.
Figure 7B:
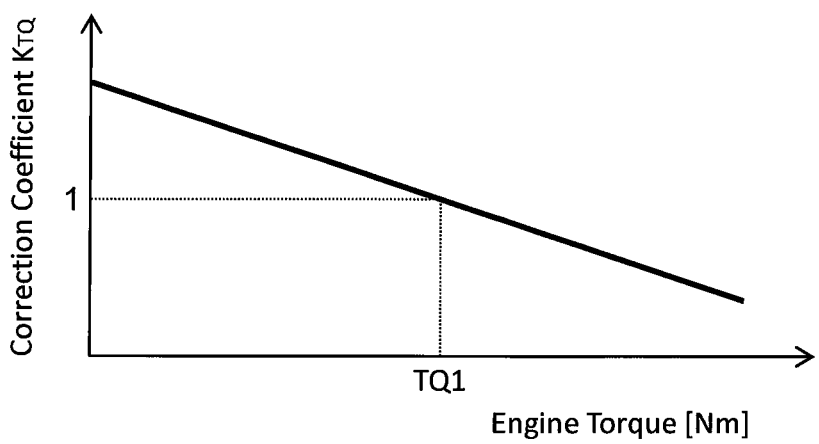
FIG. 7B is a graph showing an example of a relationship between the engine torque TQ and correction coefficient $K_{TQ}$.

FIG. 7A is a graph showing an example of a relationship between a torque increase rate ΔTQ and a correction coefficient $K_{\Delta TQ}$. FIG. 7B is a graph showing an example of a relationship between the engine torque TQ and a correction coefficient $K_{TQ}$. The torque increase rate ΔTQ mentioned here is a time rate of increase in the engine torque TQ [Nm/sec]. According to the present embodiment, the pulsation rate threshold value THp (more specifically, each of THpN, THpL1 and THpL2) is corrected on the basis of each of the torque increase rate ΔTQ and the engine torque TQ.

Specifically, the pulsation rate threshold THp is corrected as follows in accordance with the torque increase rate ΔTQ. That is to say, according to the following Equation (3), the pulsation rate threshold value THp is corrected by multiplying the base value of the pulsation rate threshold value THp by a positive correction coefficient $K_{\Delta TQ}$. It is herein assumed that the base value is the pulsation rate threshold value THp (i.e., each of THpN, THpL1 and THpL2) shown in FIG. 5. As shown in FIG. 7A, the correction coefficient $K_{\Delta TQ}$ indicates 1 when the torque increase rate ΔTQ is equal to a standard value ΔTQ1 associated with the base value. Furthermore, when the torque increase rate ΔTQ is higher than the standard value ΔTQ1, the higher the torque increase rate ΔTQ is, the greater the correction coefficient $K_{\Delta TQ}$ becomes. Conversely, when the torque increase rate ΔTQ is lower than the standard value ΔTQ1, the lower the torque increase rate ΔTQ is, the smaller the correction coefficient $K_{\Delta TQ}$ becomes.

$$THp = \text{Base Value} \times \text{Correction Coefficient } K_{\Delta TQ} \quad (3)$$

According to the correction using the correction efficient $K_{\Delta TQ}$, the pulsation rate threshold value THp is corrected to be greater when the torque increase rate ΔTQ is high than when the torque increase rate ΔTQ is low. In more detail, in the example shown in FIG. 7A, the pulsation rate threshold value THp is corrected to be greater when the torque increase rate ΔTQ is higher.

The pulsation rate threshold value THp is corrected as follows in accordance with the engine torque TQ. That is to say, according to the following Equation (4), the pulsation rate threshold value THp is corrected by multiplying the above described base value of the pulsation rate threshold value THp by the positive correction coefficient $K_{TQ}$. As shown in FIG. 7B, the correction coefficient $K_{TQ}$ indicates 1 when the engine torque TQ is equal to the standard value TQ1 associated with the base value described above. Furthermore, when the engine torque TQ is higher than the standard value TQ1, the higher the engine torque TQ is, the smaller the correction coefficient $K_{TQ}$ becomes. Conversely, when the engine torque TQ is lower than the standard value TQ1, the lower the engine torque TQ is, the greater the correction coefficient $K_{TQ}$ becomes.

$$THp = \text{Base Value} \times \text{Correction Coefficient } K_{TQ} \quad (4)$$

According to the correction using the correction coefficient $K_{TQ}$, the pulsation rate threshold value THp is corrected to be smaller when the engine torque TQ is high than when the engine torque TQ is low. In more detail, in the example shown in FIG. 7B, the pulsation rate threshold value THp is corrected to be smaller when the engine torque TQ is higher.

It should be noted that, contrary to the example described above, only one of the correction using the correction coefficient $K_{\Delta TQ}$ and the correction using the correction coefficient $K_{TQ}$ may be performed. In addition, instead of the example in which the correction coefficient $K_{\Delta TQ}$ becomes continuously greater when the torque increase rate ΔTQ is higher as shown in FIG. 7A, the correction coefficient $K_{\Delta TQ}$ may be set to be greater stepwise with two or more steps when the torque increase rate ΔTQ is higher. This also applies to the correction efficient $K_{TQ}$ shown in FIG. 7B.

1-2-5. Processing by ECU

FIG. 8 is a flowchart showing a routine of the processing relating to the fuel injection control according to the first embodiment. It should be noted that the processing of the present routine is repeatedly executed during operation of the internal combustion engine 12. In addition, according to the present routine, the engine water temperature Tw is used as an example of the "temperature correlation value" according to the present disclosure. However, a temperature correlation value other than the engine water temperature Tw may be used as long as it is correlated with the temperature of the internal combustion engine (more specifically, the temperature of the internal combustion engine body), and may be, for example, an engine lubricating oil temperature.

According to the routine shown in FIG. 8, first, the ECU 26 (processor 26a) determines, in step S100, whether or not the engine water temperature Tw detected by the water temperature sensor 58 is lower than the temperature threshold value THt2 described above. The temperature threshold value THt2 is a value for determining whether or not the internal combustion engine 12 is in an extremely low temperature state, and is, for example, −7° C. or −20° C.

When the engine water temperature Tw is lower than the temperature threshold value THt2 in step S100, the ECU 26 proceeds to step S102. In step S102, the ECU 26 selects the pulsation rate threshold value THpL2 for extremely low temperatures. After the processing of step S102, or when the engine water temperature Tw is equal to or higher than the temperature threshold value TH2t in step S100, the ECU 26 proceeds to the step S104.

In step S104, the ECU 26 determines whether or not the engine water temperature Tw is not lower than the temperature threshold value THt2 and lower than the temperature threshold value THt1 described above. The temperature threshold value THt1 is a value for determining whether or not the temperature of the internal combustion engine 12 is lower than a normal temperature, and is, for example, 20° C. or 25° C.

When the determination result of step S104 is positive (THt2≤Tw<THt1), the ECU 26 proceeds to step S106. In step S106, the ECU 26 selects the pulsation rate threshold value THpL1 (>THpL2) for low temperatures. After the processing of step S106, the ECU 26 proceeds to step S110.

When, on the other hand, the determination result of step S104 is negative (Tw>THt1), the ECU 26 proceeds to step S108. The ECU 26 selects the pulsation rate threshold value THpN (>THpL1) for normal time. After the processing of step S110, the ECU 26 proceeds to step S110.

In step S110, the ECU 26 calculates the latest pulsation rate Rp by using, for example, the method described by referring to Equation (2). The ECU 26 then determines whether or not the calculated pulsation rate Rp is higher than the pulsation rate threshold value THp (THpN, THpL1 or THpL2) which is currently selected.

When the pulsation rate Rp is equal to or lower than the pulsation rate threshold value THp in step S110, the ECU 26 proceeds to step S112. In step S112, the ECU 26 selects the first fuel injection processing that uses the air flow sensor 52.

When, on the other hand, when the pulsation rate Rp is higher than the threshold value THp in step S110, the ECU 26 proceeds to step S114. In step S114, the ECU 26 selects the second fuel injection processing that uses the throttle opening TA.

1-3. Effect

As described so far, according to the fuel injection control of the present embodiment, the threshold value THp of the pulsation rate Rp is reduced when the engine water temperature Tw (temperature correlation value) is low than when the engine water temperature Tw is high.

Figure 9:
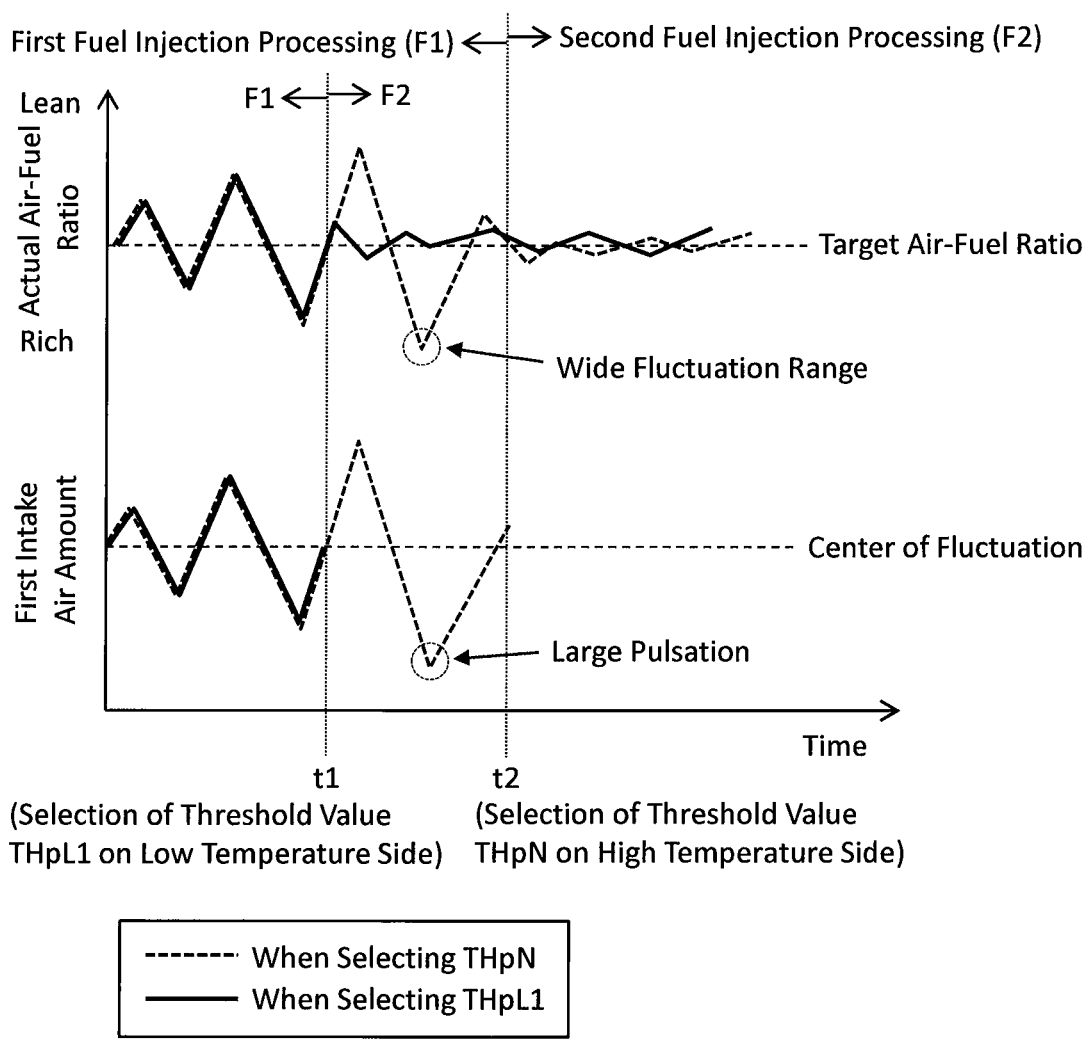
FIG. 9 is a time chart used to describe the effect of setting a pulsation rate threshold value THp according to the first embodiment.
Figure 10:
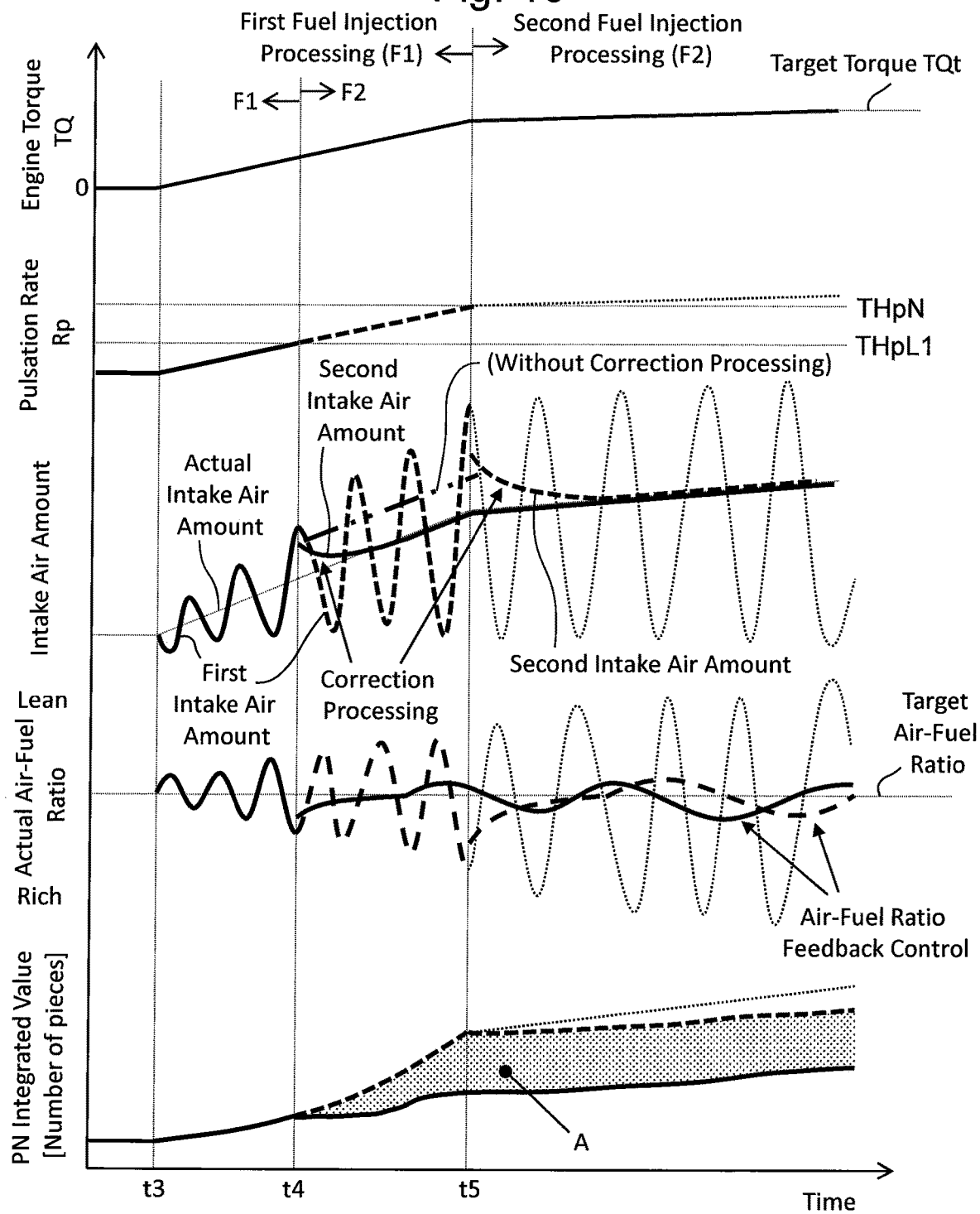
FIG. 10 is a time chart used to describe the effect of setting the pulsation rate threshold value THp according to the first embodiment.

FIGS. 9 and 10 are time charts used to describe the effect of setting the pulsation rate threshold value THp according to the first embodiment. FIGS. 9 and 10 illustrate the difference caused by the difference in the pulsation rate threshold value THp, taking, as examples, transient operating conditions in which the engine torque TQ increases with time and two threshold values THpN and THpL1. It should be noted that, in FIG. 9, only the fluctuation component of the first intake air amount is illustrated. In addition, the waveform of the second intake air amount after switching to the second fuel injection processing is omitted.

First, the effect of the fuel injection control according to the present embodiment will be described with reference to FIG. 9. A time point t1 in FIG. 9 corresponds to a time point at which the pulsation rate Rp reaches the threshold value THpL1 on the low temperature side, a time point t2 corresponds to a time point at which the pulsation rate Rp reaches the threshold value THpN on the high temperature side (for normal time). As can be seen from FIG. 9, when the threshold value THpN is used (broken line), the pulsation of the first intake air amount at the timing of switching the fuel injection processing becomes greater than when the threshold value THpL1 is used (solid line), and the fluctuation range of the actual air-fuel ratio becomes greater in association with this.

If the threshold value THpN is used in the low water temperature in which the particulate number PN increases (see FIG. 3) (that is, if the first intake air amount is used for a long time), the particulate number PN increases when the actual air-fuel ratio is shifted to the rich side. In contrast to this, according to the present embodiment, by lowering the threshold value THp at low temperatures, the switching to the second fuel injection processing that does not use the first intake air amount is performed before the pulsation of the first intake air amount becomes too large, as illustrated in FIG. 9. This makes it possible to achieve the fuel injection control that can appropriately select, based on the pulsation rate, either the first intake air amount based on the output of the air flow sensor 52 (the first fuel injection processing) or the second intake air amount based on the throttle opening degree TA (the second fuel injection processing) while reduce an increase in the particulate number PN.

Next, the effect of the fuel injection control according to the present embodiment will be described supplementarily with reference to FIG. 10. With regard to the waveforms of the intake air amount, the actual air-fuel ratio and a PN integrated value in FIG. 10, the solid line is associated with the selection of the threshold value THpL1 for low temperatures, the broken line is associated with the selection of the threshold value THpN for normal time, and the thin dotted line is associated with when the first fuel injection processing is continuously used without the switching of the fuel injection processing. The PN integrated value is an integrated value [number of pieces] of the particulate number PN after an engine start.

A time point t3 in FIG. 10 corresponds to a time point at which the engine torque TQ of the internal combustion engine 12 started by receiving a power generation request starts to increase. A time point t4 corresponds to a time point at which the pulsation rate Rp reaches the threshold value THpL1 on the low temperature side and switches to the second fuel injection processing, and a time point t5 corresponds to a time point at which the pulsation rate Rp reaches the threshold value THpN on the high temperature side and switches to the second fuel injection processing.

First, in the example in which only the first fuel injection processing shown by the thin dotted line is used, in association with an increase in the engine torque TQ, the pulsation of the first intake air amount increases, and the controllability of the air-fuel ratio decreases (i.e., the fluctuation width of the actual air-fuel ratio increases). As a result, the PN integrated value increases in association with the increase in the pulsation.

Next, the switching at the threshold value THpN on the high temperature side (broken line) and the switching at the threshold value THpL1 on the low temperature side (solid line) will be described while comparing the two. The second fuel injection processing according to the present embodiment is accompanied by the above described correction processing of the second intake air amount. Accordingly, first, it will be described that the effect of setting the threshold value THp in accordance with the engine water temperature Tw can be obtained regardless of the presence or absence of this kind of correction processing.

A two-dot chain line in FIG. 10 is associated with the second intake air amount obtained when the correction processing is not performed (i.e., the base value). The deviation of the base value (map value) of the second intake air amount from the actual intake air amount shown in FIG. 10 is generated when factors such as manufacturing variation of the internal combustion engine and an error in the characteristic value of the air flow sensor are superimposed. FIG. 10 shows an example in which the deviation of the second intake air amount is generated on the side that increases with respect to the actual intake air amount. The deviation generated as in this example becomes a factor for enriching the actual air-fuel ratio with respect to the stoichiometric air-fuel ratio. However, as illustrated in FIG. 10, this deviation basically becomes a level smaller than the amplitude of the pulsation in which the size of the particulate number PN becomes a problem. Because of this, even without the correction processing, the effect of reducing the PN integrated value by lowering the threshold value THp at low water temperatures is obtained.

On the other hand, with the correction processing described above, the second intake air amount approaches the actual intake air amount after switching to the second fuel injection processing as shown in FIG. 10. As a result, even when the deviation of the base value of the second intake air amount becomes a factor of the enrichment of the air-fuel ratio as in the example shown in FIG. 10, the enrichment of the air-fuel ratio can be reduced not only by the air-fuel ratio feedback control but also by the correction processing. Because of this, the effect of reducing the PN integrated value by lowering the threshold value THp in low water temperatures is more sufficiently obtained as compared to the example without the correction processing. More specifically, in the range of the PN integrated value that is indicated by a symbol A shown in FIG. 10, the effect of reducing the PN integrated value by lowering the threshold value THp in low water temperatures is obtained.

Moreover, the pulsation rate threshold value THp (more specifically, each of THpN, THpL1 and THpL2) used in the present embodiment is corrected to be greater when the torque increase rate ΔTQ is high than when it is low. If the engine water temperature Tw (temperature correlation value) is the same, there is a request to use the first calculation method (first fuel injection processing) suitable for the transient operating conditions as described above for a long time. By correcting the threshold value THp in accordance with the torque increase rate ΔTQ, it is possible to appropriately set the threshold value THp in accordance with the engine water temperature Tw while satisfying this kind of request.

Furthermore, the pulsation rate threshold value THp (more specifically, each of THpN, THpL1 and THpL2) used in the present embodiment is corrected to be smaller when the engine torque TQ is high than when it is low. When the engine torque TQ is high, the throttle opening degree TA becomes wide because the actual intake air amount is great. Because of this, the pulsation of the first intake air amount becomes large due to the influence of the intake air pulsation. Therefore, if the engine water temperature Tw (temperature correlation value) is the same, there is a request that, under the condition that the pulsation of the first intake air amount increases, the switching to the second calculation method (second fuel injection processing) that is not affected by the intake air pulsation be performed quickly. By correcting the threshold value THp in accordance with engine torque TQ, it is possible to appropriately set the threshold value THp in accordance with the engine water temperature Tw while satisfying this kind of request.

1-4. Modification Examples

In the first embodiment described above, three threshold values THpN, THpL1 and THpL2 which are different depending on the engine water temperature Tw is used as the pulsation rate threshold value THp. Instead of this kind of example, two pulsation rate threshold values different depending on the "temperature correlation value", such as engine water temperature, may be used. More specifically, for example, a threshold value THpN for normal time and a threshold value for low temperatures which is smaller than the threshold value THpN may be used. Furthermore, four or more pulsation rate threshold values different depending on the temperature correlation value may be used.

Figure 11:
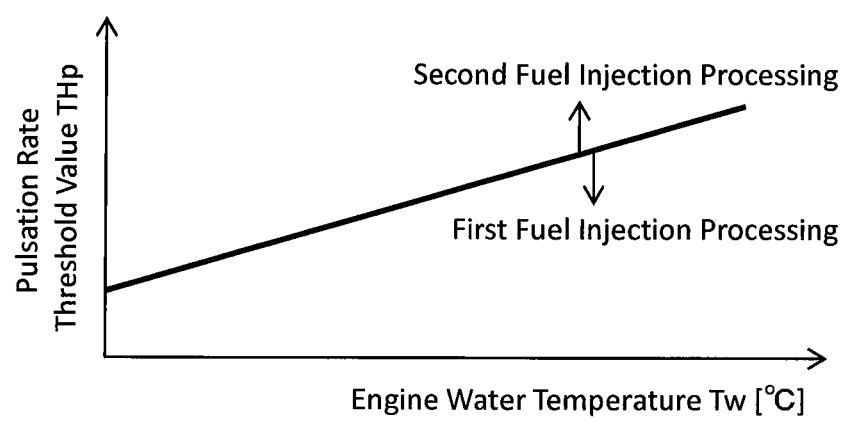
FIG. 11 is a graph showing another example of setting the pulsation rate threshold value THp.

FIG. 11 is a graph showing another example of setting the pulsation rate threshold value THp. As shown in FIG. 11, the pulsation rate threshold value THp may be set to be smaller (continuously) when the temperature correlation value, such as the engine water temperature Tw, is lower. When this kind of setting is used, the ECU 26 may, for example, execute a routine (not shown) obtained by replacing steps S100 to S108 of the routine shown in FIG. 8 with the following step. That is to say, a map that defines a relationship between the pulsation rate threshold value THp and the engine water temperature Tw as shown in FIG. 11 is stored in the ECU 26. Then, the ECU 26 executes a step of obtaining the engine water temperature Tw and a step of acquiring the pulsation rate threshold value THp depending on the acquired engine water temperature Tw from the map. Furthermore, in obtaining the pulsation rate threshold value THp in this kind of manner, the pulsation rate threshold value THp may be corrected on the basis of at least one of the torque increase rate ΔTQ and the engine torque TQ, similarly to the first embodiment.

2. Second Embodiment

Next, a second embodiment according to the present disclosure will be described with reference to FIGS. 12 and 13. The second embodiment is directed to a powertrain system 10 having the configuration shown in FIGS. 1 and 2. In the second embodiment, the following "torque increase rate limiting processing" is performed in association with the fuel injection control described in the first embodiment.

2-1. Outline of Torque Increase Rate Limiting Processing

The powertrain system 10 mounted on the REEV has a "series hybrid mode" in which the wheels 22 are driven by the MG2 while all of the motive power of the internal combustion engine 12 is used to drive the MG1 to generate an electric power. During the execution of this kind of series hybrid mode, it is not always necessary to change the engine torque TQ and the torque increase rate ΔTQ in accordance with an acceleration request of the driver. That is to say, the torque increase rate ΔTQ of the driver can be freely set.

Figure 12:
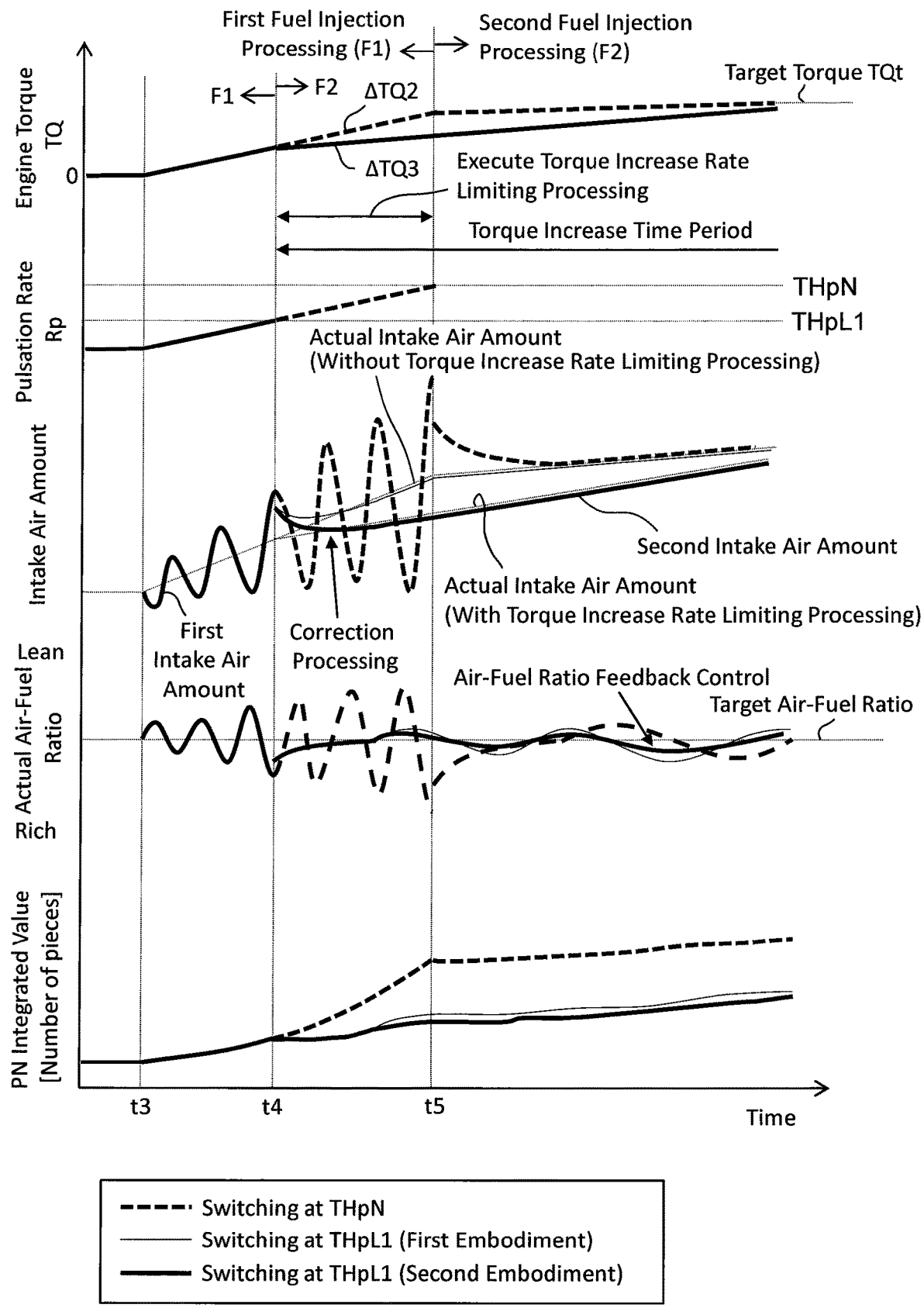
FIG. 12 is a time chart used to describe a fuel injection control accompanied by a torque increase rate limiting processing according to a second embodiment of the present disclosure.

FIG. 12 is a time chart used to describe a fuel injection control accompanied by a torque increase rate limiting processing according to the second embodiment. FIG. 12 is different from the time chart shown in FIG. 10 in the points described below.

In the example shown in FIG. 12, the torque increase rate ΔTQ (broken line) obtained when the threshold value THpN on the high temperature side is used is lower in a time period after the time point t5 at which the pulsation rate Rp reaches the threshold value THpNt than in a time period before the time point t5. A torque increase rate during a time period from the time point t4 to the time point t5 in the example in which the threshold value THpN is selected is herein referred to as ΔTQ2, and a torque increase rate during the time period in the example in which the threshold value THpL1 is selected is referred to as ΔTQ3.

In the example shown in FIG. 12, the torque increase rate limiting processing is performed during selection of the temperature threshold value THpL1 on the low temperature side. According to the torque increase rate limiting processing, the torque increase rate ΔTQ3 obtained when the threshold value THpL1 on the low temperature side is selected is limited to be lower than the torque increase rate ΔTQ2 obtained when the threshold value THpN on the high temperature side is selected.

It should be noted that, in the example shown in FIG. 12, the threshold value THpN corresponds to an example of the "first pulsation rate threshold value" according to the present disclosure, and the threshold value THpL1 corresponds to an example of the "second pulsation rate threshold value" according to the present disclosure. Furthermore, the time period from the time point t4 to the time point t5 in which the torque increase rate limiting processing is executed corresponds to a part of the "torque increase time period" according to the present disclosure.

According to the present embodiment, a fixed value is used as the torque increase rate ΔTQ3. To be more specific, a value at which the change over time in the engine torque TQ is small enough to be regarded as a steady condition in which the engine torque TQ does not change over time (e.g., 10 [Nm/s]) is used as the torque increase rate ΔTQ3. The limitation of the torque increase rate ΔTQ at ΔTQ3 can be performed, for example, as follows. That is to say, according to the torque increase rate limiting processing, the ECU 26 adjusts the throttle opening degree TA so as to coincide with a target throttle opening degree TAt required to achieve the target intake air amount according to a target torque TQt limited not to exceed ΔTQ3. Then, as a result of this kind of adjustment of the throttle opening degree TA, the actual intake air amount (thin dotted line) at or after the time point t4 is reduced as compared to when the threshold value THpN on the high temperature side is selected.

Furthermore, even during the selection of the threshold value THpL2 for extremely low temperatures, the torque increase rate limiting processing according to the present embodiment is executed similarly to the example shown in FIG. 12. Therefore, the threshold value THpL2 corresponds to another example of the "second pulsation rate threshold value" according to the present disclosure.

Additionally, in the example shown in FIG. 12, the torque increase rate limiting processing is performed in a time period corresponding to a part of the torque increase time period (e.g., the time period from the time point t4 to the time point t5) as described above. However, for the whole of the "torque increase time period" unlike the example shown in FIG. 12, the torque increase rate ΔTQ obtained when a threshold value on the low temperature side (e.g., THpL1) is used may be limited to be lower than the torque increase rate ΔTQ obtained when the threshold value THpN on the high temperature side is used.

2-2. Processing by ECU

Figure 13:
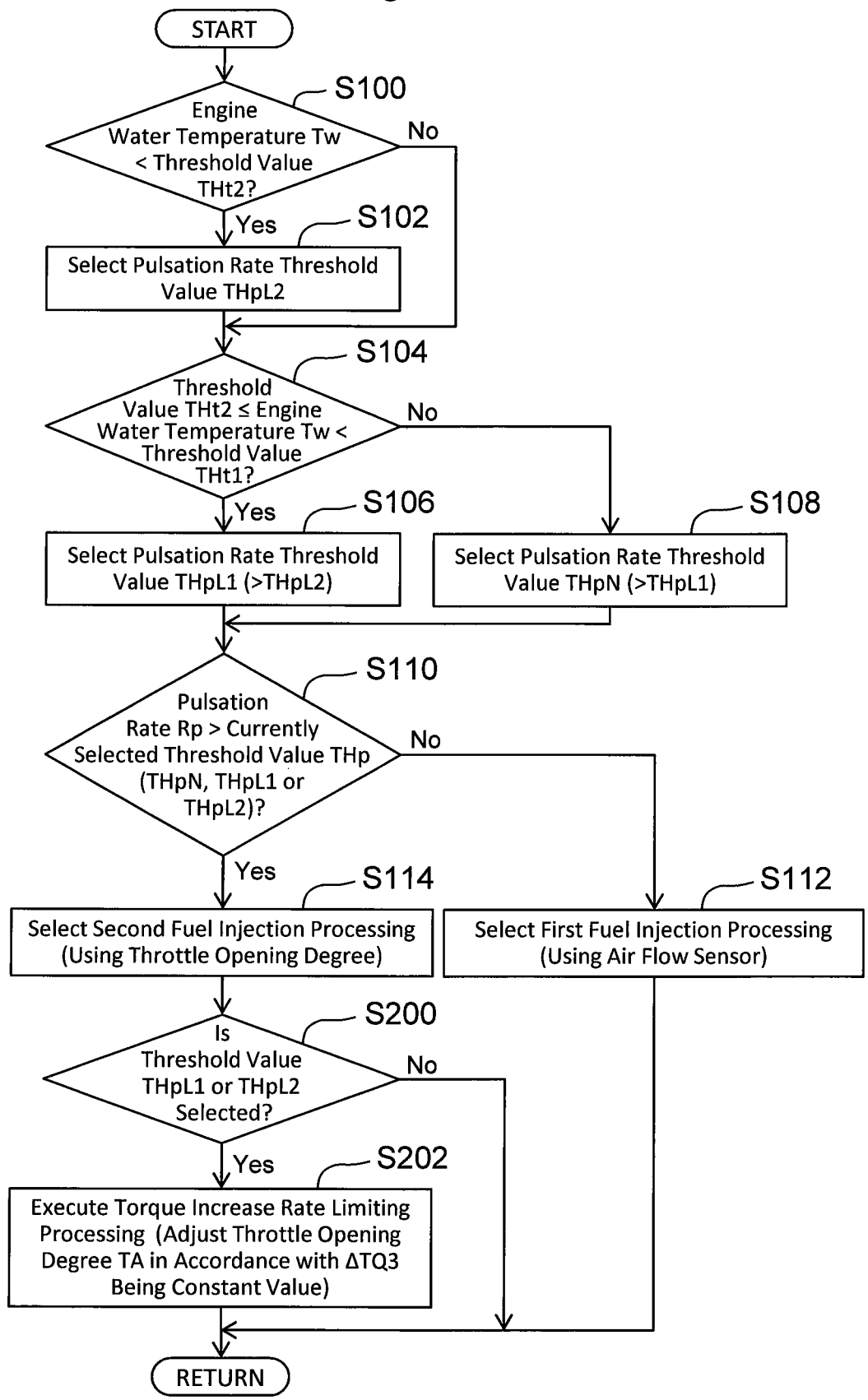
FIG. 13 is a flowchart showing a routine of processing relating to the fuel injection control accompanied by the torque increase rate limiting processing according to the second embodiment.

FIG. 13 is a flowchart showing a routine of the processing relating to the fuel injection control accompanied by the torque increase rate limiting processing according to the second embodiment. The processing of steps S100 to S114 in FIG. 13 is as already described in the first embodiment.

According to the routine shown in FIG. 13, the ECU 26 (processor 26a) proceeds to step S200 after step S114. In step S200, the ECU 26 determines whether or not the currently selected pulsation rate threshold value THp is one of the threshold values THpL1 and THpL2 on the low temperature side. When this determination result is negative, the ECU 26 ends the current processing cycle.

When, on the other hand, the determination result of step S200 is positive, the ECU 26 proceeds to step S202. In step S202, the ECU 26 executes the torque increase rate limiting processing described above. This torque increase rate limiting processing uses the above-described torque increase rate ΔTQ3 (fixed value) which is limited to be lower than the torque increase rate ΔTQ obtained when the threshold value THpN on the high temperature side is used. It should be noted that, in the present embodiment, even when either the threshold value THpL1 or THpL2 on the low temperature side is selected, the torque increase rate ΔTQ3 is used. However, in this kind of example of having a plurality of threshold values on the low temperature side, the torque increase rate ΔTQ may be limited to be even lower when the threshold value THpL2 on the lower temperature side is used than when the threshold value THpL1 is used.

2-3. Effect

As described so far, according to the torque increase rate limiting processing associated with the fuel injection control of the present embodiment, after switching from the first fuel injection processing to the second fuel injection processing when the pulsation rate threshold value THpL1 or THpL2 on the low temperature side is selected, the torque increase rate ΔTQ is limited to be lower than when the threshold value THpN on the high temperature side is selected. As a result, when the second fuel injection processing is used in a situation where the engine torque TQ is increasing at low water temperature, it is possible to cause the actual air-fuel ratio to more properly follow the target air-fuel ratio in the air-fuel ratio feedback control as shown in FIG. 12 (thick solid line). Thus, as shown in FIG. 12, the PN integrated value can be further reduced as compared with the first embodiment (thin solid line) that is not accompanied by the torque increase rate limiting processing.

It should be noted that the "torque increase rate limiting processing" according to the second embodiment described above can be similarly applied to a hybrid vehicle having the series hybrid mode other than the REEV. An example of this kind of hybrid vehicle is a series hybrid vehicle (i.e., a vehicle equipped with an electric motor for driving the vehicle, an internal combustion engine dedicated to power generation, and a generator, similar to those of the REEV in terms of hardware configuration). In addition, another example is a hybrid vehicle in which an internal combustion engine is not dedicated to power generation but can perform a series hybrid mode. This also applies to the following third embodiment.

3. Third Embodiment

Next, a third embodiment according to the present disclosure will be described with reference to FIGS. 14 and 15.

The third embodiment is different from the second embodiment in the details of the "torque increase rate limiting processing".

Figure 14:
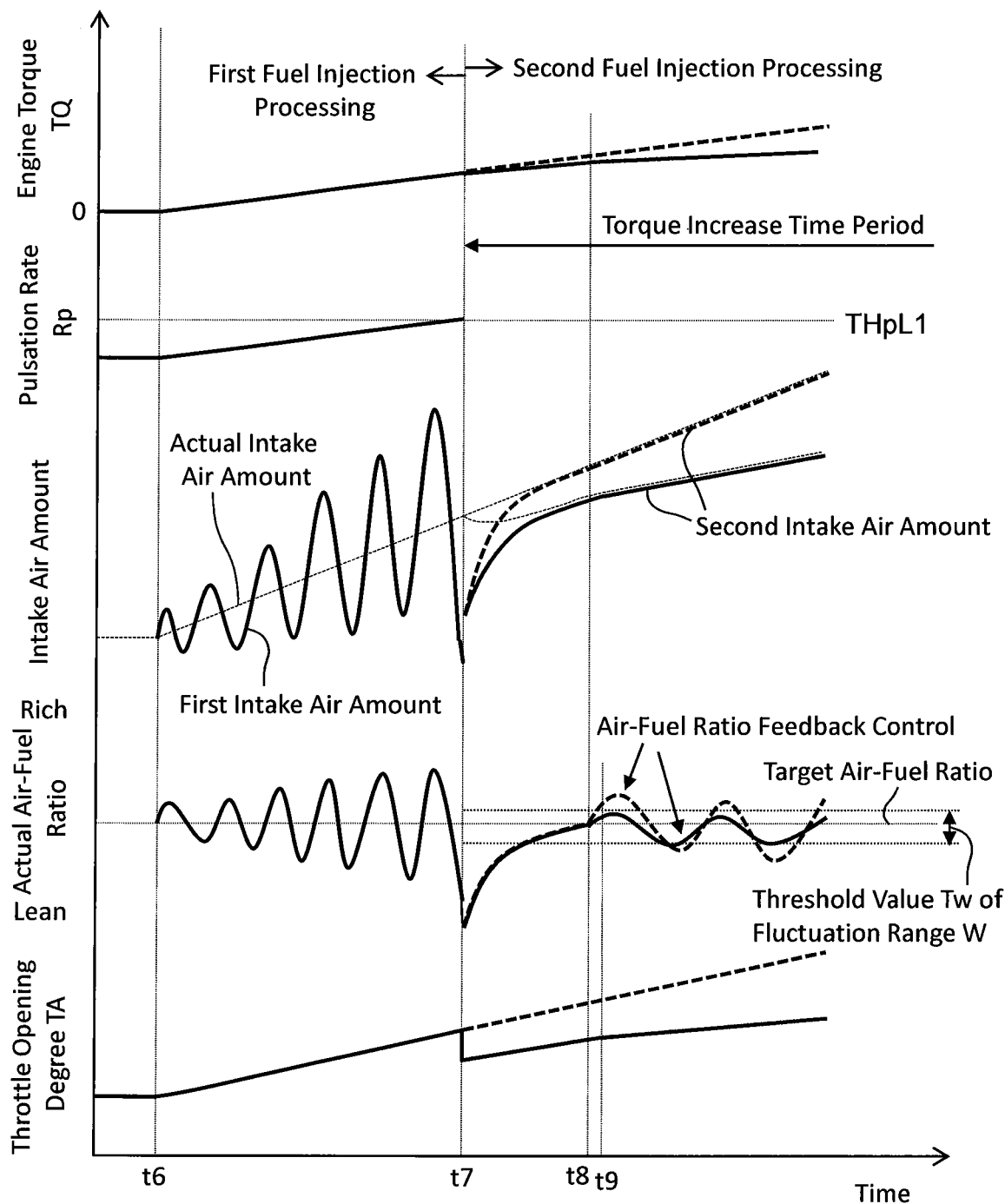
FIG. 14 is a time chart used to describe a fuel injection control accompanied by a torque increase rate limiting processing according to a third embodiment of the present disclosure.

FIG. 14 is a time chart used to describe a fuel injection control accompanied by a torque increase rate limiting processing according to the third embodiment. FIG. 14 illustrates a transient operating condition in which the engine torque TQ increases uniformly. A time point t6 corresponds to a time point at which the throttle valve 38 starts to open after the engine start, and in association with this, the engine torque TQ starts to increase. A time point t7 corresponds to a time point at which the pulsation rate Rp reaches the threshold value THpL1 on the low temperature side and switches to the second fuel injection processing.

It should be noted that, with regard to switching of the fuel injection processing during the selection of the threshold value THpL1 on the low temperature side, FIG. 14 shows a waveform of the first embodiment without the torque increase rate limiting processing by a broken line and also shows a waveform of the third embodiment by a solid line. A waveform of the engine torque TQ shown by a broken line is the same as that at the time of selecting the threshold value THpN on the high temperature side.

In the example shown in FIG. 14, the torque increase rate limiting processing is performed during a time period from the time point t7 until the engine torque TQ reaches the target torque (not shown) (i.e., the whole of the "torque increase time period") in the low water temperature conditions in which the threshold value THpL1 is selected. It should be noted that a similar torque increase rate limiting processing may also be performed in extremely low water temperature conditions in which the threshold value THpL2 is selected.

According to the torque increase rate limiting processing of the present embodiment, in order to limit the torque increase rate ΔTQ to a low value, the ECU 26 (processor 26a) adjusts the throttle opening degree TA such that a fluctuation width W of the actual air-fuel ratio associated with the air-fuel ratio feedback control in the torque increase time period shown in FIG. 14 falls within a designated fluctuation width threshold value THw. As a result, as shown in FIG. 14, the torque increase rate ΔTQ in the torque increase time period is limited to be lower during the selection of the threshold value THpL1 on the low temperature side (second pulsation rate threshold value) than when the torque increase rate limiting processing is not accompanied (i.e., during the selection of the threshold value THpN on the high temperature side (first pulsation rate threshold value)). The fluctuation width W is a fluctuation range of the actual air-fuel ratio to the target air-fuel ratio (e.g., stoichiometric air-fuel ratio). The fluctuation width threshold value THw is, for example, ±2%.

To be more specific, the limitation of the torque increase rate ΔTQ by the torque increase rate limiting processing according to the present embodiment can be performed by, for example, the following method. That is to say, as shown in FIG. 14, at the time point t7 of switching to the second fuel injection processing, the throttle opening degree TA is decreased by a designated amount. A time point t8 corresponds to a time point at which the second intake air amount converges to the actual intake air amount by the correction processing described above. After the decrease by the designated amount at the time point t7, the throttle opening degree TA is increased at a low time increase rate as compared to when the torque increase rate limiting processing is not accompanied (broken line). As a result of this kind of adjustment of the throttle opening degree TA, as shown in FIG. 14, the torque increase rate ΔTQ is limited to be lower as compared to when the torque increase rate limit processing is not accompanied (i.e., as compared to during the selection of the threshold value THpN on the high temperature side).

A time point t9 after the time point 8 corresponds to a time point at which the actual air-fuel ratio based on the output of the air-fuel ratio sensor 60 reaches a designated value near the upper limit of the threshold value THw of the fluctuation width W. At this time point t9, the ECU 26 lowers the time increase rate of the throttle opening degree TA by a designated amount as shown in FIG. 14. As a result, the actual air-fuel ratio does not exceed the upper limit of the threshold value THw as shown in FIG. 14. Then, in the example shown in FIG. 14, as a result of the adjustment of the throttle opening degree TA described above, even for the remaining time period of the torque increase time period, the fluctuation width W of the actual air-fuel ratio is within the fluctuation width threshold value THw. Furthermore, as a result of this kind of adjustment of the throttle opening TA, the torque increase rate ΔTQ in the torque increase time period at or after the time point t9 is also limited, as shown in FIG. 14, to be low as compared to when the torque increase rate limit processing is not accompanied (i.e., during the selection of the threshold value THpN on the high temperature side).

Figure 15:
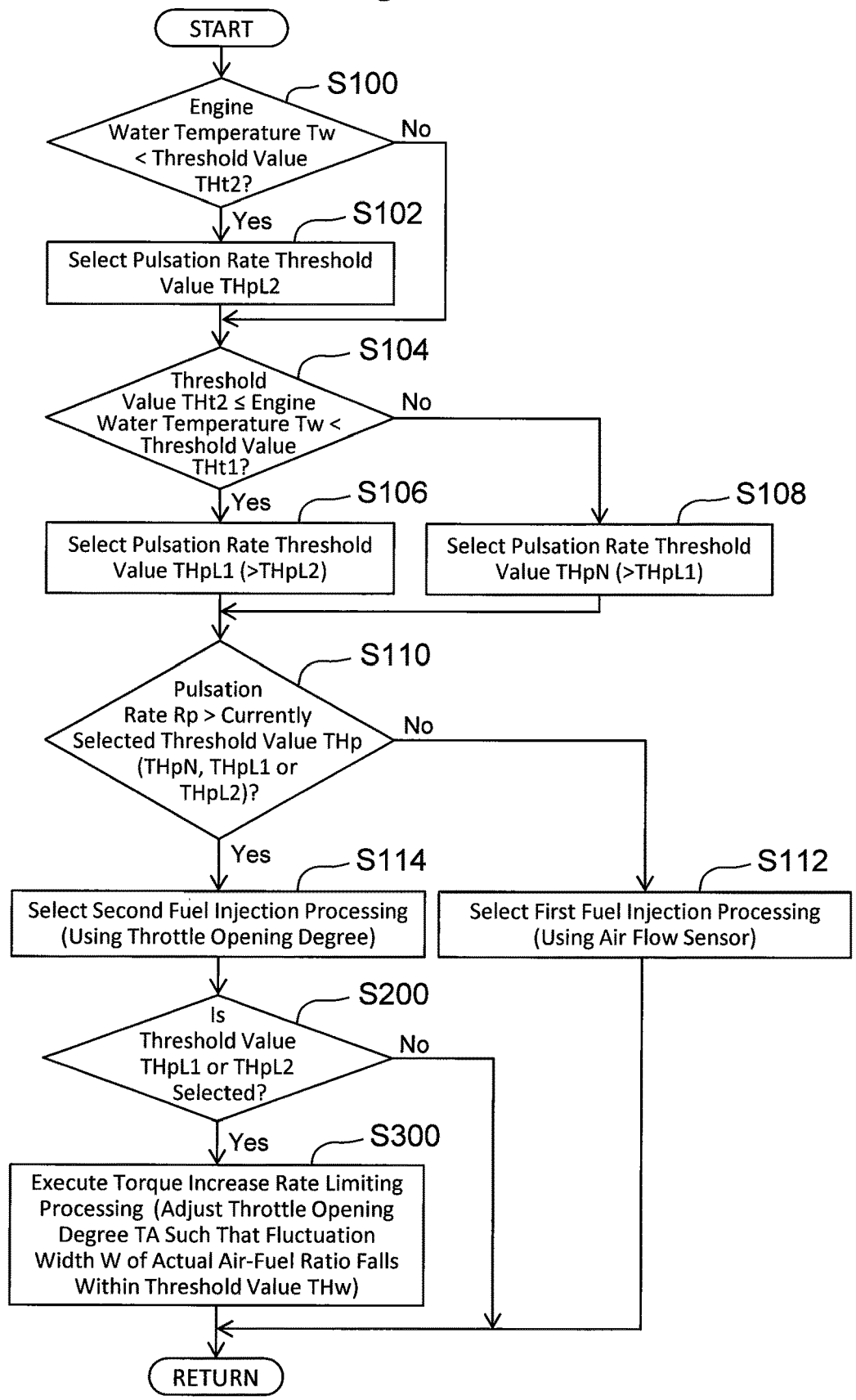
FIG. 15 is a flowchart showing a routine of processing relating to the fuel injection control accompanied by the torque increase rate limiting processing according to the third embodiment.

FIG. 15 is a flowchart showing a routine of the processing relating to the fuel injection control accompanied by the torque increase rate limiting processing according to the third embodiment. The processing of steps S100 to S114 and S200 in FIG. 15 is as already described in the second embodiment.

According to the routine shown in FIG. 15, when the determination result of step S200 is positive, the ECU 26 (processor 26a) proceeds to step S300. In step S300, the ECU 26 performs the torque-increase rate limiting processing using the method described with reference to FIG. 14.

As described so far, according to the torque increase rate limiting processing of the present embodiment, the throttle opening degree TA is adjusted such that the fluctuation width W of the actual air-fuel ratio associated with the air-fuel ratio feedback control in the torque increase time period falls within the fluctuation width threshold value THw. As a result, during the selection of the threshold value THpL1 or THpL2 on the low temperature side, the torque increase rate ΔTQ is limited to be lower than during the selection of the threshold value THpN on the high temperature side. Even with this kind of method, when the second fuel injection processing is used in a situation where the engine torque TQ is increasing under low water temperature, it is possible to cause the actual air-fuel ratio to properly follow the target air-fuel ratio in the air-fuel ratio feedback control as shown by the solid line in FIG. 14. Therefore, even with the present method, the PN integrated value can be further reduced as compared with the first embodiment that does not involve the torque increase rate limiting processing.

The embodiments and modification examples described above may be combined in other ways than those explicitly described above as required and may be modified in various ways without departing from the scope of the present disclosure.

What is claimed is:

1. An engine control device for controlling an internal combustion engine including a fuel injection device configured to supply fuel to a cylinder and a throttle valve disposed in an intake air passage, comprising:
a processor;

an air flow sensor disposed in the intake air passage upstream of the throttle valve and configured to detect an intake air flow rate; and a throttle position sensor configured to detect a throttle opening degree of the throttle valve, the processor being configured to execute a fuel injection control including:

a first fuel injection processing to control the fuel injection device so as to inject an amount of fuel according to a first intake air amount based on the intake air flow rate detected by the air flow sensor; and a second fuel injection processing to control the fuel injection device so as to inject an amount of fuel according to a second intake air amount based on the throttle opening degree detected by the throttle position sensor, the processor being configured to:

select the first fuel injection processing when a pulsation rate being a fluctuation rate of pulsation of the intake air flow rate detected by the air flow sensor is equal to or lower than a pulsation rate threshold value; and select the second fuel injection processing when the pulsation rate is higher than the pulsation rate threshold value, the pulsation rate threshold value being smaller when a temperature correlation value correlated with temperature of the internal combustion engine is low than when the temperature correlation value is high.

2. The engine control device according to claim 1, wherein the pulsation rate threshold value is corrected so as to be greater when a torque increase rate being a time rate of increase in torque of the internal combustion engine is high than when the torque increase rate is low.

3. The engine control device according to claim 1, wherein the pulsation rate threshold value is corrected so as to be smaller when torque of the internal combustion engine is high than when the torque is low.

4. The engine control device according to claim 1, wherein:

the engine control device is mounted on a hybrid vehicle including the internal combustion engine, an electric motor and a generator and having a series hybrid mode in which all of motive power of the internal combustion engine is used to drive the generator to generate electric power and a wheel of the vehicle is driven by the electric motor;

the pulsation rate threshold value includes a first pulsation rate threshold value selected when the temperature correlation value is equal to or greater than a temperature threshold value, and a second pulsation rate threshold value selected when the temperature correlation value is smaller than the temperature threshold value, the second pulsation rate threshold value being smaller than the first pulsation rate threshold value;

the processor is configured to execute a torque increase rate limiting processing during selection of the second pulsation rate threshold value; and the torque increase rate limiting processing limits a torque increase rate, which is a time rate of increase of torque of the internal combustion engine, to be lower during at least a part of a torque increase time period from when the pulsation rate reaches the second pulsation rate threshold value and a switching to the second fuel injection processing is performed until the torque of the internal combustion engine reaches a target torque, than during selection of the first pulsation rate threshold value.

5. The engine control device according to claim 4, wherein:

the engine control device includes an air-fuel ratio sensor configured to output a signal responsive to oxygen concentration of exhaust gas;

the processor is configured to execute an air-fuel ratio feedback control to adjust a fuel injection amount such that an actual air-fuel ratio based on the output of the air-fuel ratio sensor approaches a target air-fuel ratio; and in the torque increase rate limiting processing, the processor is configured to limit the torque increase rate to a low value by adjusting the throttle opening degree such that a width of fluctuation of the actual air-fuel ratio associated with the air-fuel ratio feedback control during the at least a part of the torque increase time period falls within a fluctuation with threshold value.

* * * * *